United States Patent [19]
McKernan et al.

[11] Patent Number: 5,655,019
[45] Date of Patent: Aug. 5, 1997

[54] IDENTITY PROTECTION METHOD FOR USE WITH WIRELESS TELEPHONE SYSTEMS

[76] Inventors: Randolph W. McKernan; Christian Christmas, both of P.O. Box 621, Graton, Calif. 95444

[21] Appl. No.: 413,902

[22] Filed: Mar. 30, 1995

[51] Int. Cl.⁶ ..................................................... H04L 9/00
[52] U.S. Cl. ................................................. 380/6; 380/49
[58] Field of Search .................................. 380/6, 46, 49; 455/1

[56] References Cited

U.S. PATENT DOCUMENTS

| | | | |
|---|---|---|---|
| 4,752,939 | 6/1988 | Amoroso et al. | 380/6 |
| 5,086,467 | 2/1992 | Malek | 380/6 |
| 5,091,942 | 2/1992 | Dent | 380/46 |
| 5,237,612 | 8/1993 | Raith | 380/49 |
| 5,241,598 | 8/1993 | Raith | 380/49 |

*Primary Examiner*—Salvatore Cangialosi

[57] ABSTRACT

A cellular phone identity protection system that protects the identities of cellular telephones as they initiate calls through a cellular telephone system. The identity protection is provided through the use of jamming techniques and intentional false and tagged identity transmissions designed to prevent criminals from receiving valid subscribers' mobile identities over the airwaves. Jamming transmissions are made on the same frequency as the mobile transmissions, overpowering the valid mobile signals at the criminals' receivers, thereby preventing the criminals' equipment from properly decoding the MIN, ESN, SCM and other valid data transmitted by the valid mobile unit. These same jamming transmissions are fed, 180 degrees out of phase and level adjusted, into the receive antenna lines of the cell site control channel, canceling the effects of the jamming at the cell site receivers thereby allowing valid mobile call attempts to be processed normally. False and tagged identities are transmitted in the form of call attempts and registrations on the reverse control channel served by the local cell site. These fill up the collection equipment of the criminals with useless or trackable data. Valid mobile call attempt data is made available pre-call to external systems though a data port.

20 Claims, 13 Drawing Sheets

| Abbreviation | Definition | Values | Figures |
|---|---|---|---|
| CCA | Cancellation controller adjusted | 1/0 | 5,5a,5e |
| CDF | Currently decoding flag | 1/0 | 5d,5e |
| CFI | Cancel false ID transmissions | 1/0 | 5d |
| CONFCHG | Configuration change requested | 1/0 | 5e |
| FMA | Failed mobile attempts (counter) | 0-64000 | 5e |
| FRSSI | Forward channel RSSI | 0-64000 | 5c |
| FRX | Forward control channel received signal | ------------ | 5a,5c,5d,5e |
| FTCC | Failure to cancel (counter) | 0-64000 | 5d |
| FTDMDC | Failure to decode mobile data (counter) | 0-64000 | 5e |
| FTGFCRC | Failure to get forward channel response (counter) | 0-64000 | 5d |
| GLMTA | Gather and log mobile transmission activity | 1/0 | 5,5e |
| JMT | Jam mobile transmissions | 1/0 | 5,5d |
| KSALD | Keep statistics and location data | 1/0 | 5,5e |
| LEVELADJ | Level adjusted | 1/0 | 5b |
| PHASEADJ | Phase adjusted | 1/0 | 5a |
| RRSSI | Reverse control channel receiver RSSI | 0-64000 | 5a,5b,5d |
| RRX | Reverse control channel received signal | ------------ | 5a,5b,5d |
| RT | Retune | ------------ | 5b,5c |
| SCC | Successful cancellation (counter) | 0-64000 | 5d |
| SJF | Stop jamming flag | 1/0 | 5d |
| SLCNT | Second loop count | 0-3 | 5b,5c |
| SMA | Successful mobile attempts (counter) | 0-64000 | 5e |
| SMDDC | Successful mobile data decode (counter) | 0-64000 | 5e |
| SUAC | Successful uncancelled call attempts (counter) | 0-64000 | 5d |
| TC | Tuning completed | 1/0 | 5,5c |
| TFI | Transmit false IDs | 1/0 | 5,5d |
| TTFID | Track transmitted false IDs | 0/1 | 5e |
| UFITJW | Use false IDs to jam with | 1/0 | 5,5d |
| UFLOFI | Use fixed list of false IDs | 1/0 | 5 |
| ULOTIAF | Use list of tagged IDs as false | 1/0 | 5 |
| UMVIAF | Use modified valid IDs as false | 1/0 | 5 |

Table A - Abbreviations used in flow charts of FIG. 5, and FIG. 5a through FIG. 5e.

FIG. 8

IDENTITY PROTECTION METHOD FOR USE WITH WIRELESS TELEPHONE SYSTEMS

TECHNICAL FIELD

This invention relates generally to preventing fraudulent access to wireless telephone systems. More particularly the invention relates to an article and method for preventing criminals from using RF receivers to capture valid wireless mobile telephone identities.

BACKGROUND OF THE INVENTION

The disclosure of this invention will focus on its application in the cellular telephone system. This is done for the sake of clarity and brevity, since describing the application of this invention in each of the other wireless system protocols would be needlessly tedious. It will become clear to a person reasonably skilled in this art that the methods described in this disclosure can be applied similarly to any wireless system.

In order to prevent unauthorized system access, cellular systems use pre-call validation of each call attempt prior to connection of the call. Current validation schemes include verification that the Mobile Identification Number (MIN) and Electronic Serial Number (ESN) of the cellular phone are properly activated in the local switch (a switch resident data base is queried, looking up the entry). If a match is found, then the call is connected. If the MIN/ESN pair is not found in the data base, the call is either blocked or routed to an operator or recorded announcement.

If the subscriber record (including MIN/ESN) exists in the data base of another switch on the same network, (in this case both switches are of the same manufacture) a proprietary protocol is used by the first switch to access the data base of the second switch in order to perform the same look-up.

If the subscriber record is contained in a switch made by a manufacturer other than the switch attempting to serve the call, the Interim Standard 41 (IS41—included herein by reference) protocol is used to communicate the authentication request and reply between the switches. In this case, the same MIN/ESN information is looked up at the non-serving switch for authentication.

In all of the cases described here, the authentication process involves only the verification of the existence of a data base entry containing the same MIN/ESN pair.

Currently there is extensive fraudulent access to the cellular network using stolen MIN/ESN pairs which are programmed into the phones of criminals. Once a stolen MIN/ESN identity has been programmed into another cellular telephone, the cellular switch can not distinguish this phone from the original, since a look-up of its MIN/ESN identity for validation will of course be successful. MIN/ESN pairs are captured by criminals using receivers which are tuned to the reverse control channel of a cell site. When a legitimate cellular telephone subscriber makes a call, the MIN/ESN identity of the phone (along with other pertinent data) is transmitted to the cell site on the reverse control channel of the site. Criminals listening to this reverse control channel can decode the identities that are transmitted, storing them for distribution to other criminals for use in making fraudulent calls. These identities are used locally, as well as being traded for others throughout the country.

Many systems exist, external to the cellular switch, which use various fraud detection methods to identify fraudulent calls attempted on the network. These methods generally acquire call data after the call has completed (post-call), using this data to identify fraudulent calls through geographic or dialing pattern profiles. In this instance, since the calls made by the criminals have already been completed, the damage has already been done before the calls are identified as fraudulent.

Once a MIN/ESN pair has been identified as having been compromised, the cellular carrier typically reprograms the legitimate subscriber's phone and switch records with a new phone number (MIN), invalidating the old (compromised) MIN/ESN pair. Further attempts to use the old identity are automatically blocked in the cellular switch, thereby protecting the legitimate subscriber. This method of protection is both inconvenient for the subscriber and expensive for the cellular carrier.

Even if future calls using the same stolen identities are thereby prevented, the criminals simply switch to other stolen identities in a matter of seconds and continue making illegal calls. This is made easy for the criminals due to the availability of massive numbers of valid identities. In fact, some criminals have equipment built into their phones which allows them to gather groups of valid MIN/ESN identities off the air, automatically programming their phones with lists of those identities to choose from by simple telephone keypad selections. This type of phone, commonly referred to as the Rascal (Read And Store, Call Again Later), eliminates the need for separate ESN reading equipment. Using this type of phone also minimizes the need to make regular contact with other criminals who collect and distribute MIN/ESN pairs, thereby making criminal investigations into these matters more difficult for law enforcement agencies.

If the supply of valid MIN/ESN identities available to the criminals were severely limited, and false (unusable) identities were commonly accidentally collected by the criminals, the criminals would be forced to re-use and share stolen identities. Additionally, each working valid identity would command a higher price from the criminals purchasing or trading them. Each collected identity would need to be tested prior to use or distribution. In fact, some of the false identities could actually work, but be "tagged" for tracking purposes prior to allowing them to be collected by criminals. This would allow the cellular carrier to monitor criminal call attempts data from phones which use these tagged identities. Each of these factors contributes, directly or indirectly, to the overall reduction of fraud in the cellular markets.

When the criminals begin sharing identities, inevitable concurrent call attempts using the same identity will make identification of the fraudulent activity much easier to detect. Methods such as geographical improbability and concurrent call detection will quickly identify these conditions. Also, since more criminals will concurrently use the same identity, usage patterns of the criminals are less likely to be concealed. Systems which spot unusual calling patterns and accelerated billing for individual subscribers will more easily see the additional usage of not only one, but several criminals using the same stolen identity.

The inherent design of the cellular switches will also reduce criminal usage in this case. Once a MIN/ESN identity is in use on the system (a call is in progress), that same identity is automatically blocked from being used concurrently. This means that criminals who share stolen identities cannot use their phones at the same time for making or receiving calls. This, of course, will result in less overall criminal access to the system.

Higher costs for acquisition of stolen identities will in itself discourage some criminals. In the cases where the criminals are only marginally benefiting financially from using the counterfeit technology, the cost of using stolen identities for these criminals may finally outweigh the already marginal gain.

Since tracking tagged identities will be fairly easy to accomplish, the criminals (who will learn of this) will tend to be much more careful about usage. This will further reduce the criminal access to the cellular system. Also, in the efforts to pre-test identities which have been gathered, the criminals will create a very identifiable pattern, showing identities that have been gathered as well as the times and geographic locations involved with the collection and testing activities.

From this explanation it can be seen that a method and article are needed for preventing the gathering of MIN/ESN identities of valid cellular telephones by listening in on call attempts made using a cellular system. It can also be seen that there is a need to provide a method and article which seed the cellular control channels with false and tagged MIN/ESN identities without affecting normal cellular channel usage. Further, it can be seen that there is a need to provide pre-call information to switch-external cellular fraud detection systems for all of the calls made through a cellular switch, allowing such systems to identify fraudulent calls prior to call completion.

SUMMARY OF THE INVENTION

Accordingly, it is an object of this invention to provide a method and article for preventing the illegal acquisition of valid cellular telephone MIN/ESN identities by jamming the transmissions of valid call attempts in a way that causes unauthorized cellular control channel receivers (used by criminals for stealing identities) to misinterpret the valid transmitted identities, while allowing the cell site control channel receivers to properly interpret the data and process the valid calls normally.

It is an additional object of the invention to provide an article and method for transmitting false and tagged identities on the reverse control channel for the purpose confusing criminals and filling up their data collection equipment with useless or tagged data.

It is a further object of the invention to provide an interface to the invention which allows tracking of criminal activities as they relate to collection and usage of MIN/ESN identities.

It is a further object of the invention to provide an article and method for recognizing the presence of an unauthorized forward control channel transmission source near the cell site, then taking action to also prevent data gathering on the unauthorized control channel.

It is yet a further object of the invention to provide an article and method which sends pre-call cellular data to external processes.

It is finally an object of the invention to provide an article and method for automatically tuning the jamming system to the control channel of the cell sector in which it operates, even when the control channel of that cell sector has been recently retuned.

These objects and other features and advantages are obtained in a jamming system that is positioned in or near cell sites. This jamming system sends false call attempts containing invalid or specially tagged MIN/ESN identities to the cellular system, transmitting them via the reverse control channels of the cell sites during the times these channels are idle. This requires that the jamming system equipment have a technique for insuring that every MIN/ESN identity it transmits is either an invalid (false) one or a specially tagged valid identity which is not necessarily assigned to a real subscriber. This is accomplished by collecting valid MIN/ESN identities as they are transmitted by mobiles during normal call attempts, then changing some of the values in either the MIN or ESN of each of the valid identities collected.

In some cases, cellular control channels are so busy handling normal valid call attempts that it is impractical to insert enough false call attempts to attain the desired results. In order to overcome this problem, the jamming system is capable of transmitting false call attempts (into the area where the criminals are collecting identities) on the reverse control channel while injecting an out of phase copy of the false call attempt signals directly into the local cell sector receiver's antenna transmission line, canceling out the signals from the false call attempts only at the RF input to the local receiver. This fills the criminals' data collection equipment with unusable identities, yet allows the local cell sector control channel receiver to ignore the jamming system's false call attempts while processing the valid mobile call attempts normally. Additionally, if properly timed, the false call attempts interfere with the criminals' ability to read the valid identities from the normal call attempt transmissions.

In the case where a cell sector's control channel is not busy, false call attempts can be allowed to be seen by the local control channel receiver (not canceled by injection of out of phase signals). An advantage to this technique is that the criminal's who monitor the forward control channel will see normal voice channel assignments for the false call attempts. This will prevent the criminals from deducing that an identity is false based on lack of voice channel assignment. This method requires that the jamming system equipment backs down from "glare" conditions on the control channel, always allowing valid mobile call attempts to have precedence. It is not necessary for the false call attempts to actually proceed to the voice channel (thereby using up valuable system capacity).

The invention's jamming system can also transmit certain signals (other than false call attempt data) during the data transmission of call attempts made by valid mobile subscribers. These transmitted jamming signals are designed to confuse the criminals' ESN reader equipment, yet not affect normal call processing through the local cell sector control channel receiver. As described above, these signals are locally canceled at the control channel receiver's RF antenna input, causing the local receiver to be unresponsive to the jamming signals.

Capturing the discriminator of a frequency modulation (FM) receiver (in this case, the ESN reader for jamming purposes) requires that a number of conditions are met. First, the jamming transmission must take place on a frequency sufficiently close to the operating frequency of the receiver that the receiver's discriminator is able to react to the incoming jamming signal.

Generally, significantly greater signal strength from one RF signal over another will cause the receiver's discriminator to become captured by the stronger signal, causing the discriminator not to reproduce the modulated signals of the weaker RF signal. This fact is utilized in the jamming system by insuring that the signals sent by the jamming equipment will generally arrive at the criminals' ESN readers antenna at a significantly greater strength than that of a mobile transmission. This is accomplished by transmitting the jamming RF signal with sufficient energy from an antenna system (located at or near the operative cell sector) having a similar orientation, height, polarization, and radiation pattern as the antennas of the operative cell sector. The radio coverage area of the cell sector (from whence call origination attempts will take place) is determined by the cell sector's antenna radiation patterns. These patterns are effectively duplicated to a large degree by the antennas used for the jamming system. In fact, in one embodiment of the invention, the same antennas which are used to transmit the cell sector's signals are also used to transmit the reverse control channel jamming and false identity RF signals.

Of course, sending a jamming transmission which affects the criminals' ESN reader receivers will also affect normal cell site control channel receivers. This challenge can be overcome in several ways.

First, proper positioning of the jamming transmitter's antenna in relation to the cell site receiver antennas will minimize the signal strength of any jamming transmission reaching the cell site receivers. Horizontally and vertically isolating the jamming transmit antenna from the cell sector's receive antennas reduces the strength of the jamming signal at the cell sector's receive antennas. Additionally, using directional antennas for both the cell site receivers and jamming equipment will further reduce jamming signal RF reception by the cell site receivers.

Specifically, in the present invention, a technique of carefully feeding an out of phase copy of the jamming signal into the local cell sector control channel's receiver antenna input will significantly cancel the effects of the jamming signal on the cell sector receiver's discriminator. For control channel receivers that use diversity receive techniques (typical in cellular applications), the out of phase signal is applied to each of the receivers involved with the diversity receive scheme. Proper leveling and phase synchronization of the out of phase signal at each receive antenna input is accomplished using the techniques described in the detailed description of the preferred embodiment of the invention.

In an alternate embodiment of the invention, an out of phase copy of the jamming signal's baseband component can be fed into the cell site's control channel receiver at the output of the receiver's discriminator circuit, thereby canceling the effects of the jamming transmission in the receiver's baseband circuits.

In fact, there are many points in the receive path of the control channel which could be accessed and fed a cancellation signal which eliminates the jamming effect in the control channel's receiver.

In the event that the control channel to which the jamming system is assigned is retuned by the cellular carrier, the jamming system automatically detects this reassignment and retunes itself to the newly assigned control channel. Alternately, the jamming system will accept commands which force it to retune to a given control channel for operation.

In attempts to defeat jamming of valid control channel data, criminals might introduce an unauthorized control channel (under their control) which would capture mobiles and, by using registration request commands, could cause legitimate mobiles to send their MIN/ESN identities on the unauthorized control channel where no jamming is occurring. The jamming system frequently scans all of the cellular forward control channels in order to detect the presence of an unexpected forward control channel. In the event that an unexpected forward control channel is detected, the jamming system immediately sends an alarm to the external port. Then, if configured to do so, the jamming system begins jamming the unexpected control channel (on the reverse control channel frequency). In this case, no signal cancellation is required since it is assumed that call attempts made on the unexpected control channel will not be processed by the cellular system anyway. Of course, the jamming can occur on both the legitimate local control channel and the unexpected control channel simultaneously if the jamming equipment has multiple transmitters. This can also be done by rapidly retuning a single jamming transmitter between the local control channel frequency and that of the unexpected control channel, alternating the jamming transmissions between the two channels with enough speed that no complete MIN/ESN pair can be transmitted on either channel before jamming occurs on that channel.

Since, when fully deployed, the jamming system will have reverse and forward control channel receivers connected to every cell sector of a cellular system, data from every call attempt in the cellular system will be available before the call is connected. In fact, the jamming system will see the data even before the cellular switch receives it for processing. This pre-call data is made available at an external data port on the jamming system at each cell sector. This data can be accessed by other processes which would benefit from the availability of the pre-call data.

Combined with the pre-call data, a list of false and tagged transmitted MIN/ESN identities (as well as when they were transmitted) are provided through the same data port on the jamming system. With these pieces of information, an external process can map (in near-real time) the geographic locations where specific MIN/ESN identities have been made available for collection, as well as the locations where the same identities have been tested or used. This allows the cellular carrier (or its agents) to more easily investigate criminal activities relating to the stealing and use of cellular phone identities.

The invention can better be visualized and understood by turning to the following drawings where like elements are referenced by like numerals.

BRIEF DESCRIPTION OF THE DRAWINGS

FIG. 8 is a table which defines abbreviations used in the simplified flow charts.

DETAILED DESCRIPTION OF THE PREFERRED EMBODIMENT

Figure 1:
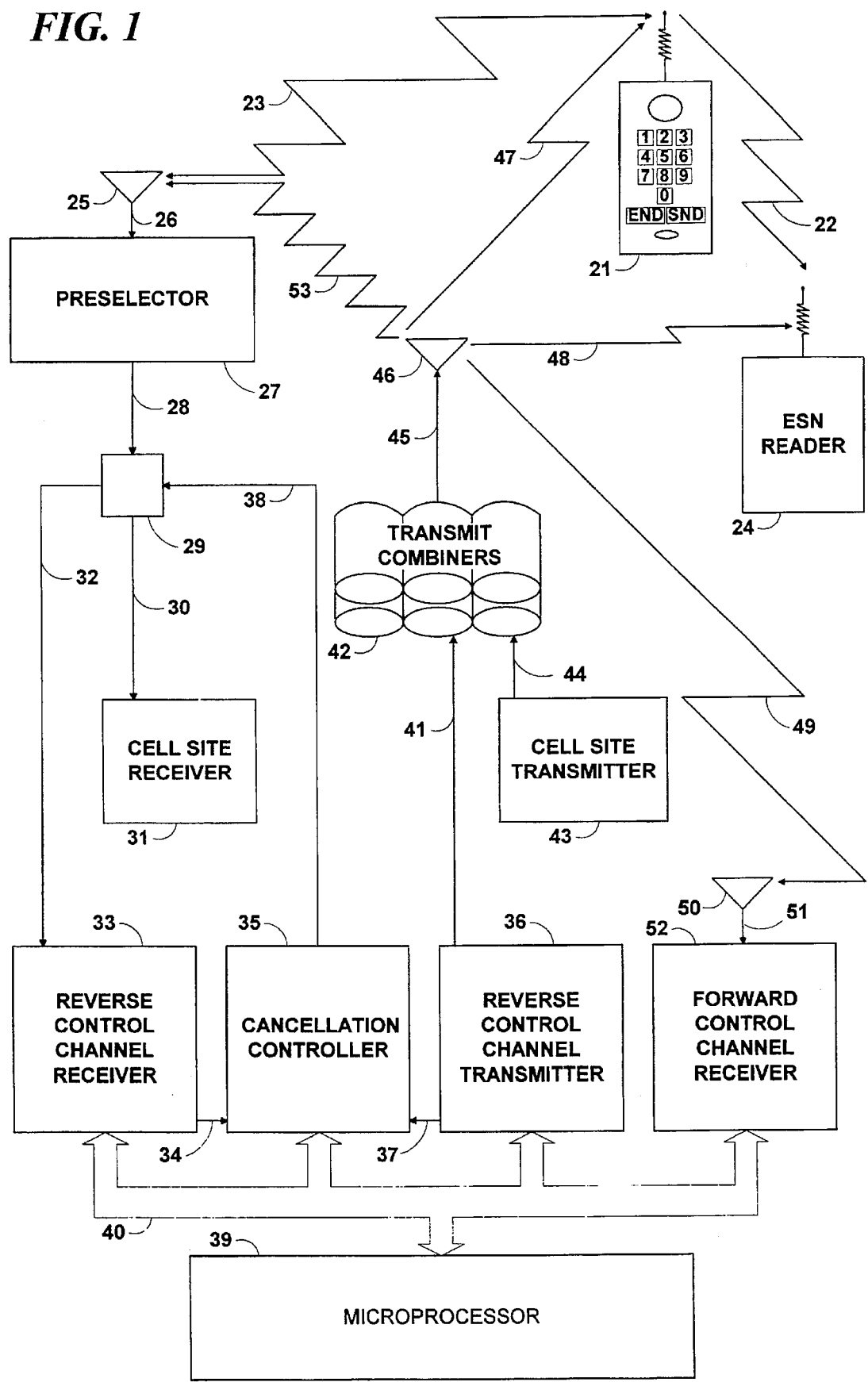
FIG. 1 is a simplified block diagram of the preferred embodiment of the invention as it interconnects to existing cell site sector equipment.

Referring to the drawings, a preferred embodiment of the invention will be described. First, the hardware and processes will be described, following which will be a description of the operation of the software which controls the invention's hardware and processes.

Now referring to FIG. 1 of the drawings, it can be seen that a valid cellular telephone 21, when originating a call attempt, sends a RF data transmission 23 to the cell sector receive antenna 25. This RF data transmission 23 contains the MIN and ESN of the valid cellular telephone 21. The same RF data transmission 23 also follows radio path 22, reaching a criminal's ESN reader 24. By receiving the RF data transmission 23 following radio path 22, the ESN reader 24 is able to decode the valid cellular telephone's 21 MIN and ESN. The RF data transmission 23 normally reaches cell sector receive antenna 25, then passes through the cell sector receiver antenna coax 26, reaching preselector 27. From there RF data transmission 23 passes through preselector output coax 28, impedance matching device 29, and cell receiver input coax 30, finally reaching cell sector control channel receiver 31. Cell sector control channel receiver 31 decodes the MIN and ESN from RF data transmission 23, using the data for validation purposes. Once validation has occurred, cell sector control channel transmitter 43 sends a voice channel assignment to valid cellular telephone 21 in an RF data message through cell transmitter coax 44, transmit combiners 42, cell sector transmit antenna coax 45, cell sector transmit antenna 46, and RF transmit path 47. Upon decoding of the voice channel assignment message, valid cellular telephone 21 immediately retunes to the assigned voice channel to wait for call connection. The voice channel assignment RF data message also follows radio path 48. Through radio path 48, ESN reader 24 receives and decodes the voice channel assignment RF data message.

Since cell sector control channel transmitter 43 is tuned to a frequency which is 45 Mhz higher than that to which cell sector control channel receiver 31 is tuned, and cell sector transmit antenna 46 is properly positioned in reference to cell sector receive antenna 25, any RF signals transmitted by cell sector control channel transmitter 43 which travel local radio path 53 are significantly suppressed before reaching cell sector control channel receiver 31.

As described above, the normal sequence of events in the cellular environment allows the criminal to use the ESN reader 24 to gather and decode radio transmissions from valid cellular telephone 21, thereby compromising the MIN, ESN, Station Class Mark (SCM), Dialed Digits (DD), and all other transmitted data from valid cellular telephone 21.

Preventing the compromise of this data is accomplished in this invention by interfering with the normal reception of cellular radio frequency signals by ESN reader 24 while not interfering with the normal operation of the cell site sector in which the invention is operating. Each of the main functions performed by this invention are described below in related sections.

Jamming the reception of valid MIN/ESN combinations

One of the main functions performed is preventing criminals from decoding valid subscriber MIN/ESN combinations as they are transmitted during call setup on the cellular system. Now referring to FIG. 1 and FIG. 2 it can be seen that this is accomplished in the following sequence. First, the valid cellular telephone 21 begins an RF transmission of data on the reverse control channel of the operative cell sector. This transmission follows mobile to cell radio path 23, reaching cell sector receive antenna 25. From cell sector receive antenna 25, the RF data transmission then passes through the cell sector receiver antenna coax 26, reaching preselector 27. From there the RF data transmission passes through preselector output coax 28, impedance matching device 29, and jamming reverse control channel receiver input coax 32, finally reaching jamming reverse control channel receiver 33. As soon as the beginning of the data transmission reaches the jamming reverse control channel receiver 33, a rise in the received signal strength (RSSI) voltage occurs on jamming receiver RSSI signal line 34. Through reverse channel RSSI A/D converter 55 and control and data bus 40, microprocessor 39 detects this rise in RSSI, then immediately initiates the transmission of a "jamming" signal by the jamming reverse control channel transmitter 36. This jamming signal can consist of transmissions masked as registrations or call attempts containing "false" IDs (MIN/ESN/SCM combinations which aren't valid) or "tagged" IDs (MIN/ESN/SCM combinations which are allowed access to the cellular system, but are set aside for tracking criminal activity). Alternately, this jamming signal can consist of any number of signal types modulated onto the radio frequency of the reverse control channel in such a way as to cause ESN reader 24 to improperly decode the data transmitted by valid cellular telephone 21.

The transmitted signal from jamming reverse control channel transmitter 36 travels through jamming reverse control channel transmitter output coax 41, transmit combiners 42, cell sector transmit antenna coax 45, cell sector transmit antenna 46, then via radio path 48 to be received by ESN reader 24. Transmit combiners 42 prevent signals sent by cell sector control channel transmitter 43 via cell site transmitter coax 44 from interfering with signals sent by jamming reverse control channel transmitter 36 through the same cell sector transmit antenna coax 45 and cell sector transmit antenna 46. While signals sent by both cell sector control channel transmitter 43 and jamming reverse control channel transmitter 36 reach valid cellular telephone 21 via RF transmit path 47, the signal sent by jamming reverse control channel transmitter 36 is ignored by valid cellular telephone 21 because it is sent on the reverse control channel frequency which valid cellular telephone 21 cannot receive on. This jamming signal's signal strength at the antenna of ESN reader 24 is typically greater than that of the signal received from valid cellular telephone 21 due to the height of cell sector transmit antenna 46 combined with the generally higher transmit power level of jamming reverse control channel transmitter 36. This results in the well known "capture effect", causing the ESN reader 24 to demodulate and decode the signal sent via radio path 48 by jamming reverse control channel transmitter 36 instead of the signal received via radio path 22 sent by valid cellular telephone 21.

A side effect of sending the jamming transmission to the ESN reader 24 via radio path 48 is that the same transmission follows radio path 53 to cell sector receive antenna 25. From there, the signal travels through cell sector receive antenna coax 26, preselector 27, preselector output coax 28, impedance matching device 29, cell receiver input coax 30, to cell sector control channel receiver 31. Under normal circumstances, this jamming signal would be received at a much greater RSSI than that of the signal sent by valid cellular telephone 21 via radio path 22. This would normally result in the capture effect, causing the cell sector control channel receiver 31 to demodulate and decode the signal sent via radio path 53 by jamming reverse control channel transmitter 36 instead of the signal received via radio path 23 sent by valid cellular telephone 21. In order to prevent this, a cancellation controller 35 is used to feed an out of phase copy of the jamming signal to the cell sector control channel receiver 31 via cancellation controller output coax 38, impedance matching device 29, and cell receiver input coax 30. This out of phase copy of the original jamming signal effectively cancels the effect of the original jamming signal as it is received by cell sector control channel receiver 31, allowing cell sector control channel receiver 31 to receive and properly decode the transmission of valid cellular telephone 21.

Now referring to FIG. 1, it can be seen that the source of the copy of the original jamming signal is jamming reverse control channel transmitter 36. Jamming reverse control channel transmitter 36 operates on the reverse control channel frequency of the local cell sector.

Figure 6:
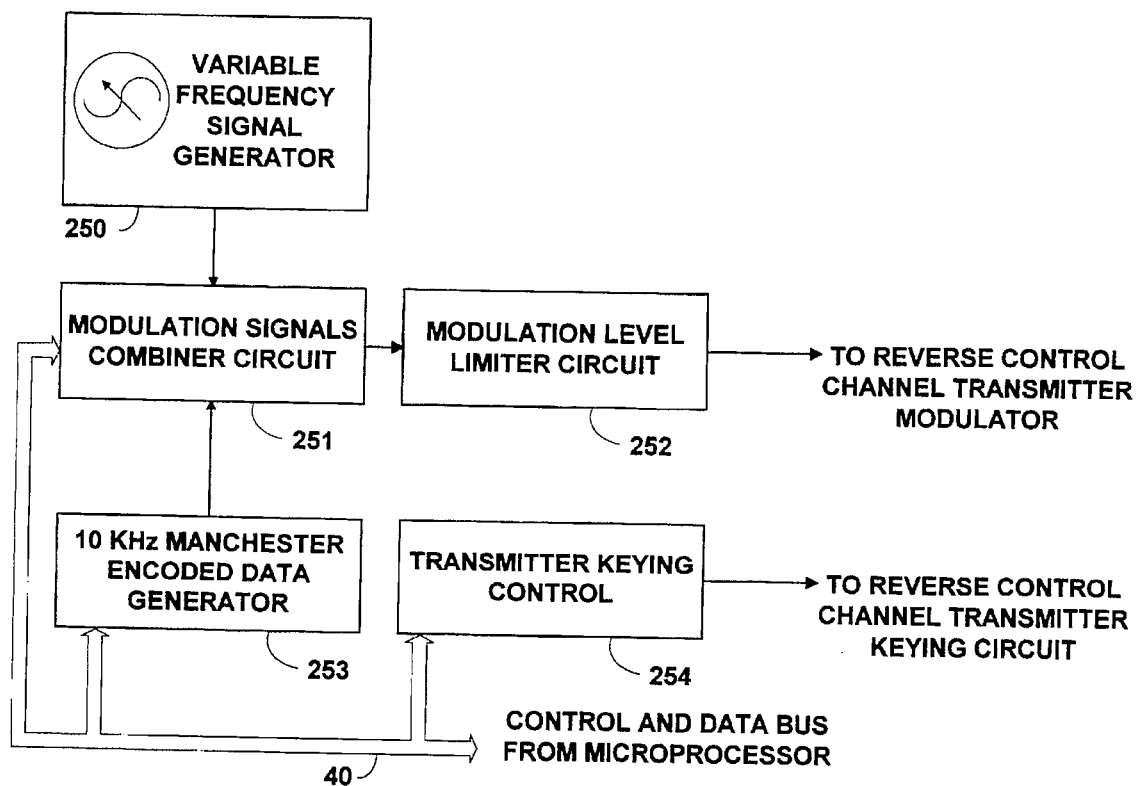
FIG. 6 is a block diagram of the base band circuits of the reverse control channel transmitter according to the preferred embodiment of the invention.

Now referring to FIG. 6, base band circuit 56 of jamming reverse control channel transmitter 36 includes modulation signals combiner circuit 251 and 10 Khz Manchester encoded data generator circuit 253, both of which are controlled via control and data bus 40 by software operating in microprocessor 39. These circuits are instructed when (and when not) to send signals to modulation level limiter circuit 252. The input signal to modulation signals combiner circuit 251 is variable frequency signal generator circuit 250. Software operating in microprocessor 39 also controls when jamming reverse control channel transmitter 36 is keyed by communicating with transmitter keying control circuit 254 via control and data bus 40.

Since modulation signals combiner circuit 251 receives inputs from both 10 Khz Manchester encoded data generator circuit 253 and variable frequency signal generator circuit 250, the modulation source for any single RF jamming transmission can be either an analog jamming signal provided by variable frequency signal generator circuit 250, or a data signal containing false and tagged IDs provided by 10 Khz Manchester encoded data generator circuit 253. It is also possible for both of these jamming signal sources to be used simultaneously, being mixed in the modulation signals combiner circuit 251. In the preferred embodiment of the invention, variable frequency signal generator circuit 250 is operated at a slowly varying frequency approximating 10 Khz. However, in an alternative embodiment of the invention variable frequency signal generator circuit 250 could operate at any fixed baseband frequency or any combination of fixed baseband frequencies. In yet another embodiment of the invention, software operating in microprocessor 39 could control the frequencies and mode of operation of variable frequency signal generator circuit 250.

Figure 2:
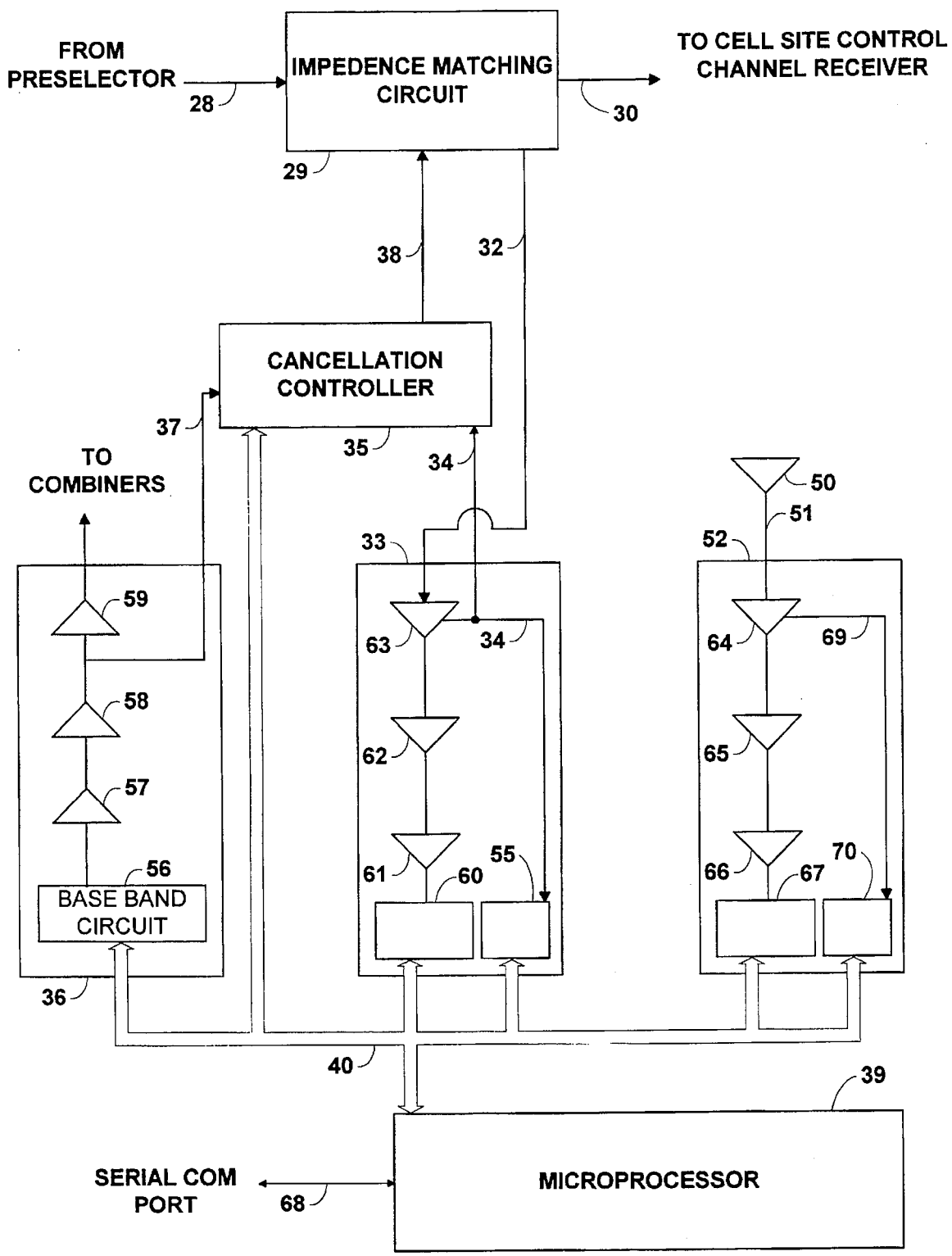
FIG. 2 is a simplified block diagram of the jamming system equipment according to the preferred embodiment of the invention.
Figure 3:
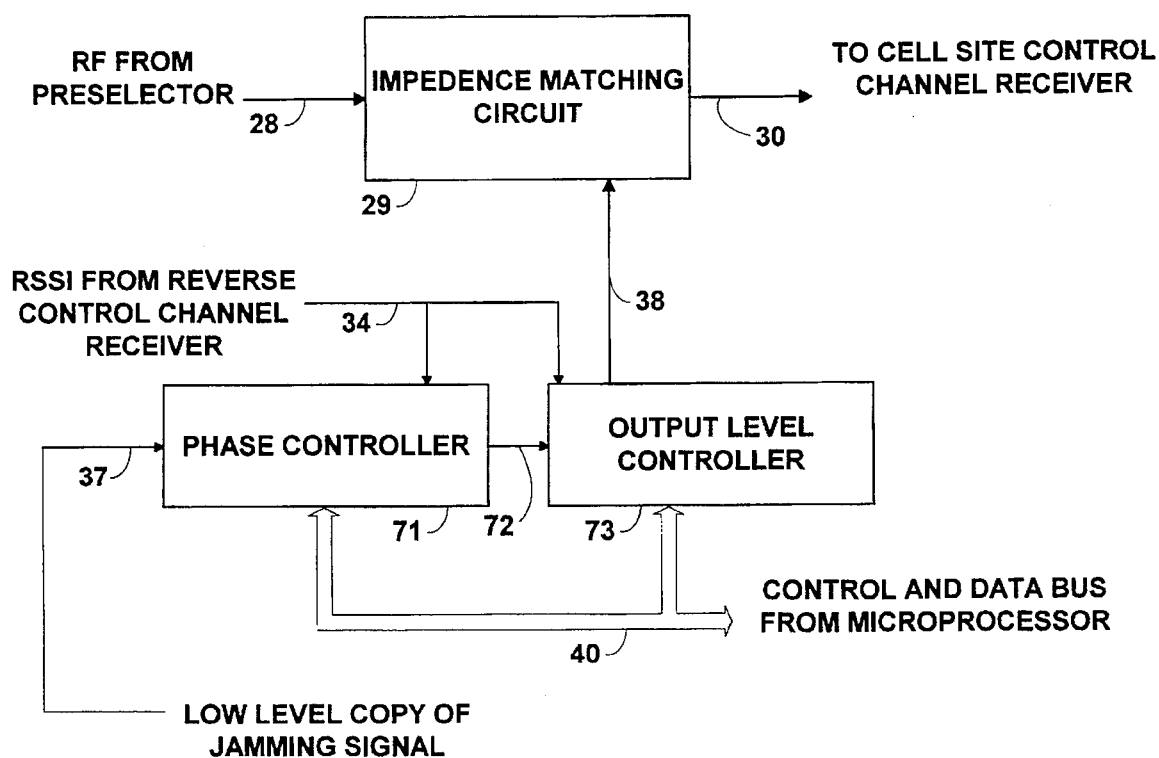
FIG. 3 is a simplified block diagram of the jamming system's cancellation controller according to the preferred embodiment of the invention.

Now referring to FIG. 2 and FIG. 3, it is seen that the output baseband signal generated in base band circuit 56 is fed to modulator 57. After modulating the reverse control channel frequency signal with the baseband signal, modulator 57 sends the modulated RF signal to transmit RF driver circuit 58. RF driver circuit 58 drives one copy of the modulated RF signal to the input of transmit RF amplifier 59, and another copy of the same signal to cancellation controller 35 through low level jamming signal path 37. This relatively low level copy of the jamming signal arrives at phase controller circuit 71 of cancellation controller 35. The copy of the RF signal which arrives at the input to transmit RF amplifier 59 is there amplified to its transmit level. The output of transmit RF amplifier 59 propagates through jamming reverse control channel transmitter output coax 41, transmit combiners 42, cell sector transmit antenna coax 45, cell sector transmit antenna 46, and radio path 48 to reach ESN reader 24.

Cancellation controller 35, as detailed in FIG. 3, consists of phase controller circuit 71, which converts a low level copy of the jamming signal arriving on low level jamming signal path 37 to the proper phase for cancellation, output level controller circuit 73, which adjusts the final level of the out of phase copy of the jamming signal received from phase controller circuit 71 via phase controller RF output signal path 72, before transmitting the level adjusted signal into impedance matching device 29 via cancellation controller output coax 38. This out of phase copy of the jamming signal is combined in impedance matching device 29 with mobile transmission signals and the original copy of the jamming signal arriving via preselector output coax 28. Since combining the level and phase adjusted copy of the jamming signal with the original jamming signal effectively cancels both of these signals, the non-canceled mobile transmission signals are the only ones which proceed to the cell sector control channel receiver 31 via cell receiver input coax 30.

The actions of phase controller circuit 71 and output level controller circuit 73 are controlled by software operating in microprocessor 39 via control and data bus 40. A copy of the RSSI from the jamming reverse control channel receiver 33 is fed into both the phase controller circuit 71 and output level controller circuit 73 via jamming receiver RSSI signal line 34.

Filling ESN readers with bad data

A second function performed by this invention is that of filling the ESN reader 24 with information which is useless, false, or tagged for use in criminal investigations. This is inherently accomplished as described above if the jamming transmission consists of transmissions masked as registrations or call attempts containing "false" IDs (MIN/ESN/SCM combinations which aren't valid) or "tagged" IDs (MIN/ESN/SCM combinations which are allowed access to the cellular system, but are set aside for tracking criminal activity).

If instead of transmitting these jamming transmissions during that of a valid cellular telephone 21, the transmissions are made as normal cellular mobile call attempts or registrations, contending for control channel access according to standard cellular protocol, the jamming transmissions will still be received via radio path 48 and decoded by ESN reader 24. With a sufficient quantity of these jamming transmissions reaching ESN reader 24, the storage capacity of ESN reader 24 is soon reached, leaving ESN reader 24 filled with false or tagged IDs. Certainly the quantity and timing of the jamming transmissions can be set to insure that the largest portion of the data collected by ESN reader 24 will be false or tagged.

Of course, transmitting too high a quantity of false call attempts or registrations will begin to interfere with the normal traffic carrying capacity of the control channel. In order to prevent this, special software operates in microprocessor 39 which detects contention for the control channel with a valid cellular telephone 21, then immediately abandons the jamming transmission attempt to seize the control channel. This is done by detecting, through reverse channel RSSI A/D converter 55 via control and data bus 40, that the RSSI has risen on jamming receiver RSSI signal line 34 is such a way as to indicate the presence of a second transmitter operating on the control channel.

Gathering IDs (valid and illegal radio activity)

One advantage to the jamming reverse control channel receiver 33, is that all mobile transmissions made on the reverse control channel will be decoded through reverse channel baseband A/D converter 60 via control and data bus 40 by software operating in microprocessor 39. These decoded transmissions can be time stamped and passed to external entities through external data communications port 68 as a pre-call feed of call attempts and registrations. Of course external data communications port 68 could be a serial, parallel, or any other type of communications port based on the specific compatibility needs of the external entity. Similarly, since software operating in microprocessor 39 keeps track of the specific times and locations of its own jamming transmissions, this data can be passed to external entities through external data communications port 68.

The full process of this decoding includes valid cellular telephone 21 transmitting a data message modulated onto an RF signal at the local sector's reverse control channel frequency. This transmission arrives at cell sector receive antenna 25 via radio path 23. From cell sector receive antenna 25, the RF data transmission then passes through the cell sector receiver antenna coax 26, reaching preselector 27. From there the RF data transmission passes through preselector output coax 28, impedance matching device 29, and jamming reverse control channel receiver input coax 32, finally reaching jamming reverse control channel receiver 33. Reverse channel RF receive front end circuit 63 processes the RF signal, sending the signal to reverse channel IF circuit 62. After conversion, reverse channel IF circuit 62 sends its output signal to reverse channel discriminator 61. Reverse channel baseband A/D converter 60 receives the baseband signal from reverse channel discriminator 61. This baseband signal is digitized by reverse channel baseband A/D converter 60, the digital form of the signal then being sent to microprocessor 39 via control and data bus 40. Software operating in microprocessor 39 converts the digitized signal into the original data message sent by valid cellular telephone 21.

Monitor self performance through statistical analysis of pre-call data

During the course of operation of the invention, statistical data regarding call events received and processed by the invention are stored by software operating in microprocessor 39. The data stored for each received and transmitted control channel event includes the MIN, ESN, Station Class Mark (SCM), type of event (registration, call attempt, page response, etc.), RSSI, date and time of each event. This data is regularly or conditionally reviewed by the software for the purpose of analyzing the performance of the invention and its affects on the normal operation of the local cell sector.

An unusually high incidence of failed valid cell attempts (no busy/idle bit response on the forward control channel) would indicate that the operation of the invention may be interfering with the valid call attempts. An unusually high incidence of failure to receive a voice channel assignment for valid call attempts would similarly indicate that the operation of the invention may be interfering with the normal completion of the valid call attempts.

Conditions described above can be detected by software operating in microprocessor 39 through the monitoring of reverse channel RSSI A/D converter 55, reverse channel baseband A/D converter 60, and forward channel baseband A/D converter 67 via control and data bus 40.

Send analysis of data to external entity

When optioned to do so, microprocessor 39 can time stamp and send this statistical data and or the analysis of this data to external entities via external data communications port 68. Optionally, the data from each individual control channel event can also be transmitted out external data communications port 68 in real time. This data has great value when converted to information by automated applications for engineering, customer service, and other entities.

For instance, the pre-call data provided to external entities allows customer service personnel of the cellular carrier to have immediate access to current and historical call events, providing them with the opportunity to review very current activity with customers.

Another example of the use of the data is for an engineering application to process the RSSI values associated with each event on the reverse control channel of a given cell sector, thereby discovering the relative distances from the cell site where the call events are occurring. Plotting this information on a map can show the engineers where the concentrations of events indicate the need for a new cell site, or the need for an "overlay/underlay" reconfiguration of an existing cell site.

Automatically stop jamming if interfering with cell performance

Additionally, this pre-call data can be stored locally by microprocessor 39 for use in statistically analyzing the control channel activity events by software operating in microprocessor 39. The analysis of this data includes a real-time check of the performance of the normal cell site sector operation. The software operating in microprocessor 39 will automatically detect cell site sector performance degradations that are due to the operation of the invention. Should this occur, software operating in microprocessor 39 will automatically inhibit further operation of the invention until the problem has been cleared. Additionally, an automatic adjustment of the phase cancellation circuitry will be performed as described further in this disclosure. This statistical analysis data can also be time stamped and passed to external entities through external data communications port 68.

Identify bandit testing and compromises of valid IDs

The statistical analysis of this pre-call activity also provides software operating in microprocessor 39 an opportunity to identify mobile transmissions which contain false or tagged IDs, thus identifying attempts by criminals to test for validity or unwittingly use these IDs. In identifying patterns of testing false IDs by criminals, the software operating in microprocessor 39 can recognize valid IDs which have been compromised and are being tested by criminals. Combining this information with the records of when and where these false IDs being tested were originally sent as jamming transmissions, investigators will know both where and when the criminals gathered the IDs as well as where and when the criminals are testing them.

Modify valid IDs for use as false IDs

In the preferred embodiment of the invention, providing a source of false IDs for jamming transmissions can be accomplished in two ways. First, a fixed list of false IDs can be manually stored for access by software operating in microprocessor 39. This can be done by communication with microprocessor 39 via external data communications port 68. An alternate method of providing a source of false IDs for jamming transmissions is accomplished by modifying data decoded from valid mobile transmissions. By modifying only the MIN or the ESN of data gathered from a valid mobile transmission, the software operating in microprocessor 39 insures that the resultant MIN/ESN/SCM identity is invalid.

Spot illegal control channels

In an attempt to defeat the jamming technology, criminals could set up and operate an illegal cellular control channel from a location inside the coverage area of a legal cellular system. These criminals could then begin collecting MIN/ESN IDs by causing local mobile units to "lock on" to the illegal control channel, then forcing the units to transmit a registration. When the mobile unit transmits a registration, the MIN, ESN, and SCM of the mobile are sent in the data message.

In order to prevent criminals from successfully operating this scheme, the invention scans through the list of all cellular control channels, keeping a record of the received signal strength of each channel. This is done by software operating in microprocessor 39 controlling jamming forward control channel receiver 52 via control and data bus 40 in such a manner as to cause jamming reverse control channel transmitter 36 to retune rapidly through the known control channel frequencies on a regular basis. Each control channel frequency to which jamming forward control channel receiver 52 tunes is sampled for RSSI via forward channel receiver RSSI signal line 69 monitoring forward channel RSSI A/D converter 70, sending resultant values back, via control and data bus 40, to the software operating in microprocessor 39.

If the signal strength of any control channel significantly rises, it could be an indication of an illegal control channel presence. If a series of tests determine that the new control channel signal configuration is due to an illegal control channel operating locally, the invention sends an alarm message to an external entity via external data communications port 68.

If optioned to do so, a second jamming source transmitter (identical to jamming reverse control channel transmitter 36) will automatically be tuned to the offending control channel frequency and begin sending jamming transmissions on the new frequency. Alternately, jamming reverse control channel transmitter 36 can be controlled by software operating in microprocessor 39 via control and data bus 40 in such a manner as to cause jamming reverse control channel transmitter 36 to retune rapidly between the two control channel frequencies, alternately sending jamming transmissions on each of the two control channel frequencies.

Detect re-tune of cell sector control channel

If the control channel frequency of the cell site sector to which the jamming system is connected is retuned (as often occurs in cellular systems), the software operating in microprocessor 39 detects the disappearance of the data stream on the original frequency as well as detecting a significant drop in the received signal strength indication (RSSI) of the forward control channel as it received by jamming forward control channel receiver 52. Now referring to FIG. 2, it can be seen that forward control channel frequency signals arriving at jamming forward control channel receiver antenna 50 via radio path 49 propagate via jamming forward control channel receiver input coax 51 into forward channel RF receive front end circuit 64. These signals are then are processed by forward channel RF receive front end circuit 64 which sends an RSSI signal via forward channel receiver RSSI signal line 69 into forward channel RSSI A/D converter 70, forward channel RF receive front end circuit 64 also sending a processed copy of the radio signals to forward channel IF circuit 65 where, upon conversion, are sent to forward channel discriminator 66. The resultant baseband signals are then received by forward channel RSSI A/D converter 70.

Microprocessor 39 communicates with forward channel RSSI A/D converter 70 via control and data bus 40, receiving constant input updating the status of the RSSI signals. Microprocessor 39 also communicates with forward channel baseband A/D converter 67 via control and data bus 40, receiving constant input of forward control channel data signals. Through the processes of decoding the forward control channel data signals and analyzing the forward channel RSSI signals, the software operating in microprocessor 39 is able to detect the conditions indicating that the cell sector control channel frequency has changed. Upon detection of these conditions, the jamming system immediately stops any transmissions and begins a search procedure for finding the new operating control channel frequency for the sector to which it is connected.

Auto-retune radio hardware

This search procedure consists of scanning all of the cellular control channels (using jamming forward control channel receiver 52 under the control of software operating in microprocessor 39), determining which control channel is now in use by the cell site sector to which the jamming system is connected.

Referring to FIG. 2, it can be seen that this determination is made by software operating in microprocessor 39 comparing the RSSI of each tested forward control channel (seen by forward channel RSSI A/D converter 70) against the original forward control channel RSSI (stored on initialization of the software and hardware processes), recording a list of those channels whose RSSIs closely approximate the original forward control channel RSSI. Those control channels which closely approximate the same RSSI as the original forward control channel RSSI will likely belong to the sectors of the local cell site.

Call attempts (using a valid MIN/ESN identity) are then made using jamming forward control channel receiver 52 and jamming reverse control channel transmitter 36 under the control of software operating in microprocessor 39 on each of the control channels on the matching RSSI list. During these call attempts, an out of phase copy of the reverse control channel transmitted call attempt signal is injected into impedance matching device 29 via low level jamming signal path 37 as described in above. This out of phase copy of the reverse control channel transmitted call attempt signal effectively cancels the transmitted call attempt signal only at the input to cell receiver input coax 30, thereby preventing cell sector control channel receiver 31 from seeing the call attempt transmissions. When an attempt is made on a control channel other than the one in use by cell sector control channel receiver 31, the call will be successfully processed by the cellular system (this will be detected by decoding a corresponding voice channel assignment for the call in forward control channel signals received by jamming forward control channel receiver 52). If a call attempt is not processed on one of the control channels on the matching RSSI list, it can be assumed that the effect of the cancellation signal is causing the failure of the attempt, indicating the correct operating channel has been located. In order to confirm that the cancellation effect is causing the call attempts to fail, multiple call attempts can be made to verify that the new local operating control channel frequency has been located.

Once it has been determined that the new control channel frequency has been found, the jamming system tunes jamming forward control channel receiver 52, jamming reverse control channel receiver 33, and jamming reverse control channel transmitter 36 to the new frequency. Once tuned to the new frequency, the jamming system performs an automated phase and level alignment as described below, then begins jamming again. Any failure to locate, tune to, or adjust to the new control channel frequency causes software operating in microprocessor 39 to send an alarm message to an external entity via external data communications port 68. As a safeguard, any failures of this type will also cause software operating in microprocessor 39 to stop all jamming activities immediately.

An alternate to requiring an automated search procedure is for the jamming system to respond to incoming data commands via external data communications port 68 which reconfigure the control channel operating frequency and other parameters of operation.

Detect need for cancellation circuits adjustment

Under certain conditions, adjustment of the level and phase synchronization of the out of phase copy of the jamming signal is required. Automatic detection of such conditions is accomplished by the software operating on microprocessor 39.

Now referring to FIG. 1 and FIG. 2, when the software detects that jamming transmission call attempts which should be canceled (and therefore unreceivable at cell sector control channel receiver 31 and jamming reverse control channel receiver 33) are receiving voice channel assignments over the forward control channel frequency (as decoded by jamming forward control channel receiver 52), the software assumes that this indicates that the cancellation phase and/or level is in need of adjustment on cancellation controller 35.

Another indication of maladjusted cancellation circuits is a sharp rise in the RSSI level on jamming receiver RSSI signal line 34 at the instant that jamming reverse control channel transmitter 36 is keyed (transmits). This can be detected by software operating on microprocessor 39 through communications with reverse channel RSSI A/D converter 55 via control and data bus 40.

Yet another indication that the cancellation circuits need adjustment is when data messages sent by jamming reverse control channel transmitter 36 (operating on the local reverse control channel) are decoded by the software through reverse channel baseband A/D converter 60 of jamming reverse control channel receiver 33. Since the RF signal onto which these data messages are modulated should be canceled at impedance matching device 29, any decoding of these data messages indicates that the cancellation has not taken place properly.

Automatically adjust cancellation circuits

Proper leveling and phase synchronization of the out of phase signal is accomplished using the techniques described here.

Fine tuning of the phase shift of the low level copy of the jamming signal is accomplished automatically by sending a test transmission out from jamming reverse control channel transmitter 36 (operating on the local reverse control channel) while monitoring the RSSI signal level on jamming receiver RSSI signal line 34 through reverse channel RSSI A/D converter 55 of jamming reverse control channel receiver 33. Software operating on microprocessor 39 controls phase controller circuit 71, adjusting the output phase of the low level copy of the jamming signal passing through cancellation controller 35 until the monitored RSSI signal is at minimum value (indicating a lower signal strength).

Fine tuning of the output amplitude level of the low level copy of the jamming signal is accomplished only after the phase shift adjustment described above is completed. This is done automatically by sending a test transmission out from jamming reverse control channel transmitter 36 (operating on the local reverse control channel) while monitoring the RSSI signal level on jamming receiver RSSI signal line 34 through reverse channel RSSI A/D converter 55 of jamming reverse control channel receiver 33. Software operating on microprocessor 39 controls output level controller circuit 73, adjusting the output amplitude level of the low level copy of the jamming signal passing through cancellation controller 35 until the monitored RSSI signal is at minimum value (indicating a lower signal strength).

Once this fine tuning is completed, the circuits are left in this state for further jamming transmissions.

Accept external commands

Figure 7:
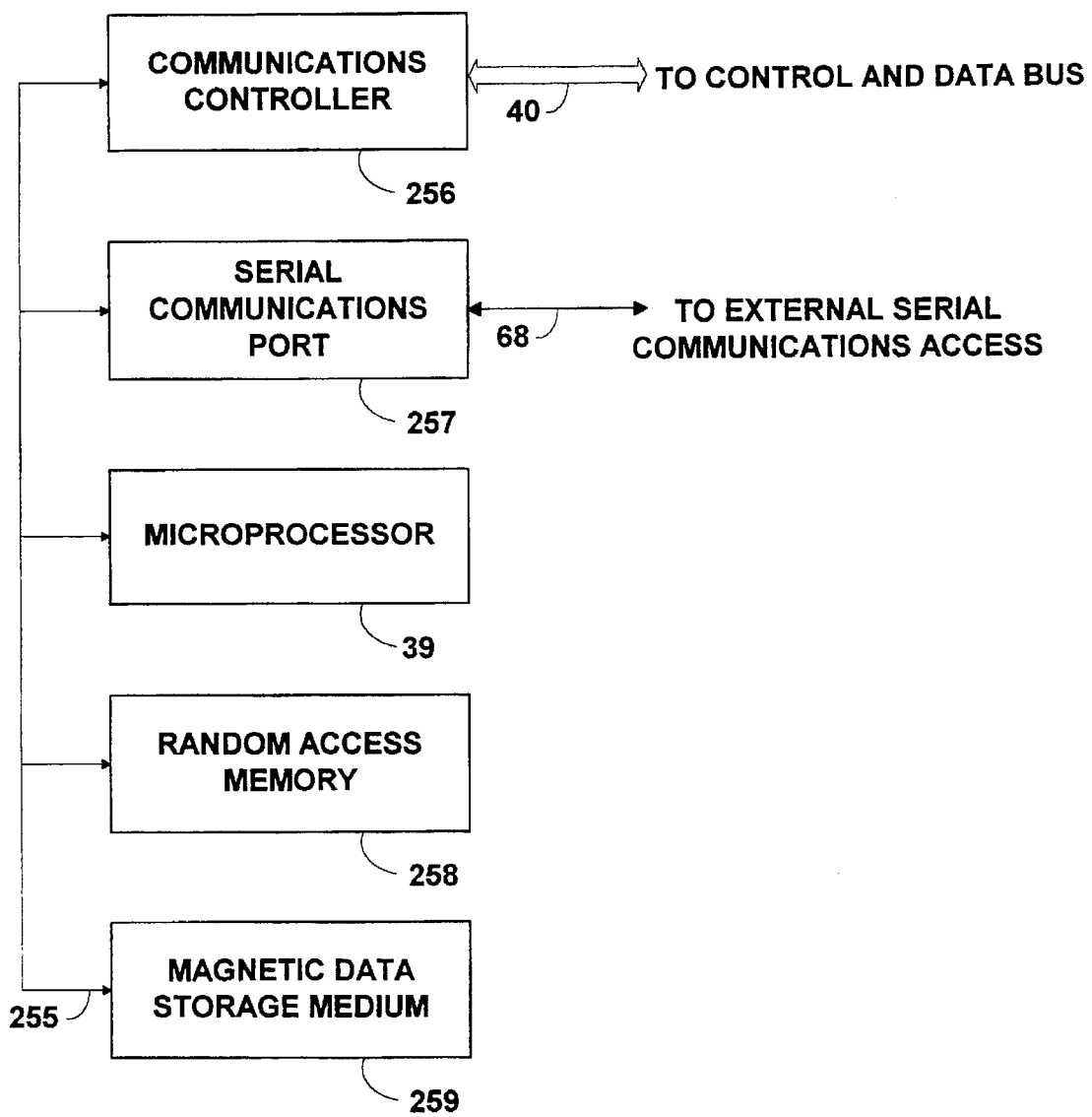
FIG. 7 is a block diagram of the microprocessor control and data circuits according to the preferred embodiment of the invention.

Referring now to FIG. 7, external data communications port 68 is used to allow microprocessor 39 to receive external commands as well as respond to those commands via serial communications port 257. Serial communications port 257 is the same port used for sending real time data and statistics to external entities. Commands are recognized and responded to by software residing in random access memory 258 and operating in microprocessor 39 via local microprocessor bus 255. Commands recognized by the software include those which force a retuning of the control channel frequency, those which force the starting and stopping of the jamming process functions, as well as those commands which change the default configurations of the operation of the invention. Changes to default configurations are stored in the magnetic data storage medium 259 which is in communications with microprocessor 39 via local microprocessor bus 255. Using communications controller 256 via local microprocessor bus 255 and control and data bus 40, the software is able to communicate with and control the actions of the entire invention.

Diversity receive operation

Diversity receivers are often used for cellular control channel operation in order to improve performance of reception in the presence of Raleigh fading conditions. The operation of two identical receiver systems, finally combining their outputs in their baseband circuits is the essence of the diversity design.

Figure 4:
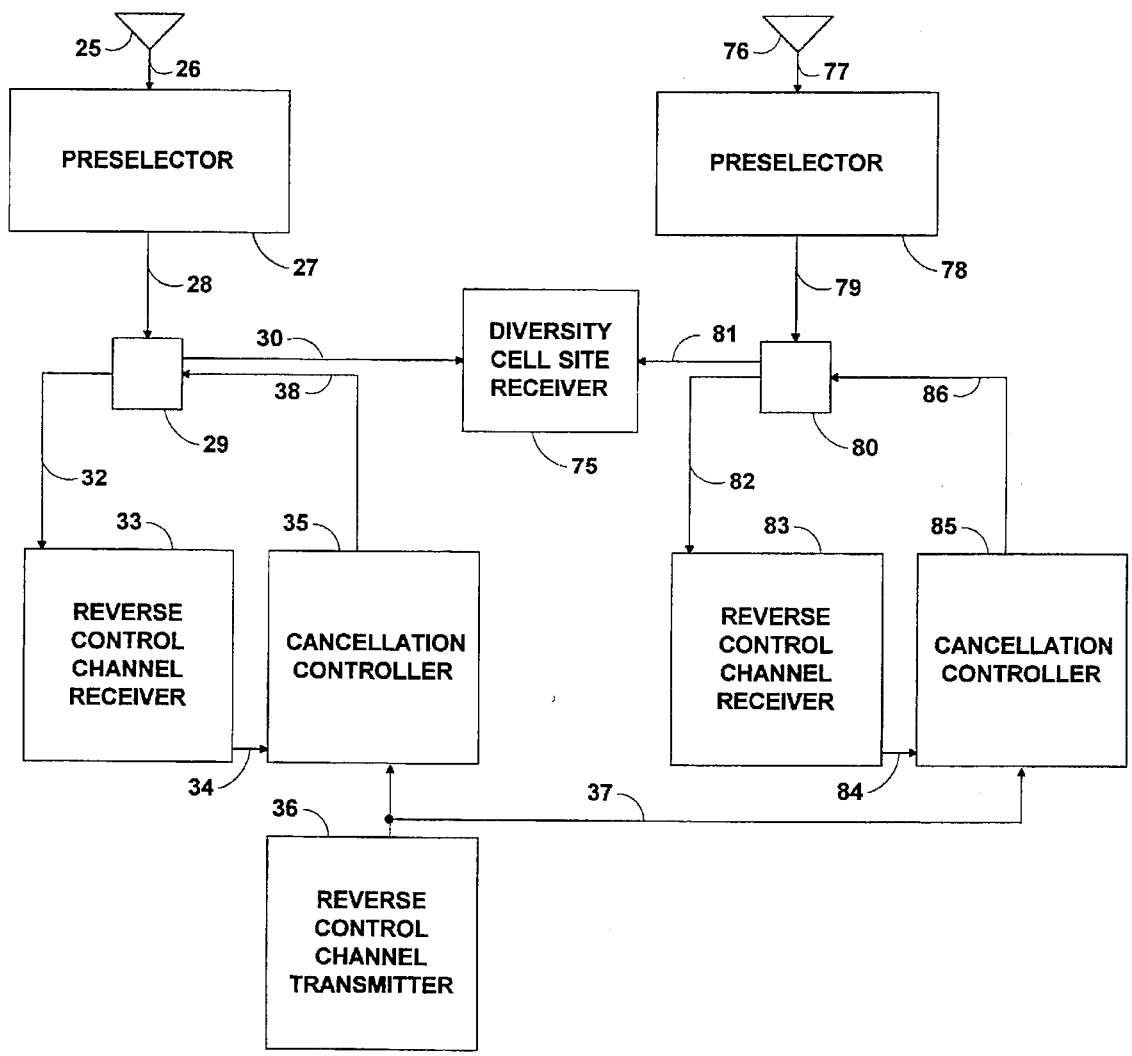
FIG. 4 is a simplified block diagram of the preferred embodiment of the invention as it interconnects to existing diversity receive cell site sector equipment.

Now referring to FIG. 4, a configuration of the invention is described that is operable in a diversity receive scheme. In the configuration shown in FIG. 4, multipath signal fading is minimized due to proper physical positioning of the second cell sector receive antenna 76 in relation to cell sector receive antenna 25.

Now following the signal paths of a normal reverse control channel transmission made by valid cellular telephone 21, the transmitted RF signal arrives at cell sector receive antenna 25, passing through cell sector receive antenna coax 26, preselector 27, preselector output coax 28, impedance matching device 29, and cell receiver input coax 30, finally reaching the first receive input of cell sector reverse control channel diversity receiver 75. A second output of impedance matching device 29 passes the received RF signal through jamming reverse control channel receiver input coax 32 to the RF input of jamming reverse control channel receiver 33. This same RF signal arrives simultaneously at second cell sector receive antenna 76, from there radiating through second cell sector receive antenna coax 77 into second preselector 78. After processing by second preselector 78 the RF signal is sent to the second receive input of cell sector reverse control channel diversity receiver 75 via second preselector output coax 79, second impedance matching device 80, and second cell receiver input coax 81. A second output of second impedance matching device 80 passes the received RF signal through second jamming reverse control channel receiver input coax 82 to the RF input of second jamming reverse control channel receiver 83.

A single jamming reverse control channel transmitter 36 is used to generate the jamming signal transmissions. The low level copy of the jamming signal leaves jamming reverse control channel transmitter 36 via low level jamming signal path 37 which splits to deliver identical copies of the low level copy of the jamming signal to both cancellation controller 35 and second cancellation controller 85.

Cancellation controller 35 phase and level adjusts the low level copy of the jamming signal to effect cancellation of the original jamming signal when the phase and level adjusted low level copy of the jamming signal is injected into impedance matching device 29 through cancellation controller output coax 38. Jamming receiver RSSI signal line 34 is used to pass RSSI signals from jamming reverse control channel receiver 33 to cancellation controller 35.

Second cancellation controller 85 phase and level adjusts the low level copy of the jamming signal to effect cancellation of the original jamming signal when the phase and level adjusted low level copy of the jamming signal is injected into second impedance matching device 80 through second cancellation controller output coax 86. Second jamming receiver RSSI signal line 84 is used to pass RSSI signals from second jamming reverse control channel receiver 83 to second cancellation controller 85.

Now referring to FIG. 1, it is seen that in both normal and diversity receive implementations of the invention, the original jamming signal from jamming reverse control channel transmitter 36 is radiated out through jamming reverse control channel transmitter output coax 41, transmit combiners 42, cell sector transmit antenna coax 45, cell sector transmit antenna 46, from there following radio path 48 to finally arrive at ESN reader 24.

Software Description

Now referring to FIG. 5, FIG. 5a, FIG. 5b, FIG. 5c, FIG. 5d, and FIG. 5e, a detailed description of the operation of the invention is given with reference to software control. Table A, seen in FIG. 8, provides an alphabetically organized list of the abbreviations, including their definitions as used in the flow charts of FIG. 5, FIG. 5a, FIG. 5b, FIG. 5c, FIG. 5d, and FIG. 5e. Note that, as a standard, when variables described in this software have binary values, the value of 1 (one) equals yes or positive and the value of 0 (zero) equals no or negative.

Figure 5:
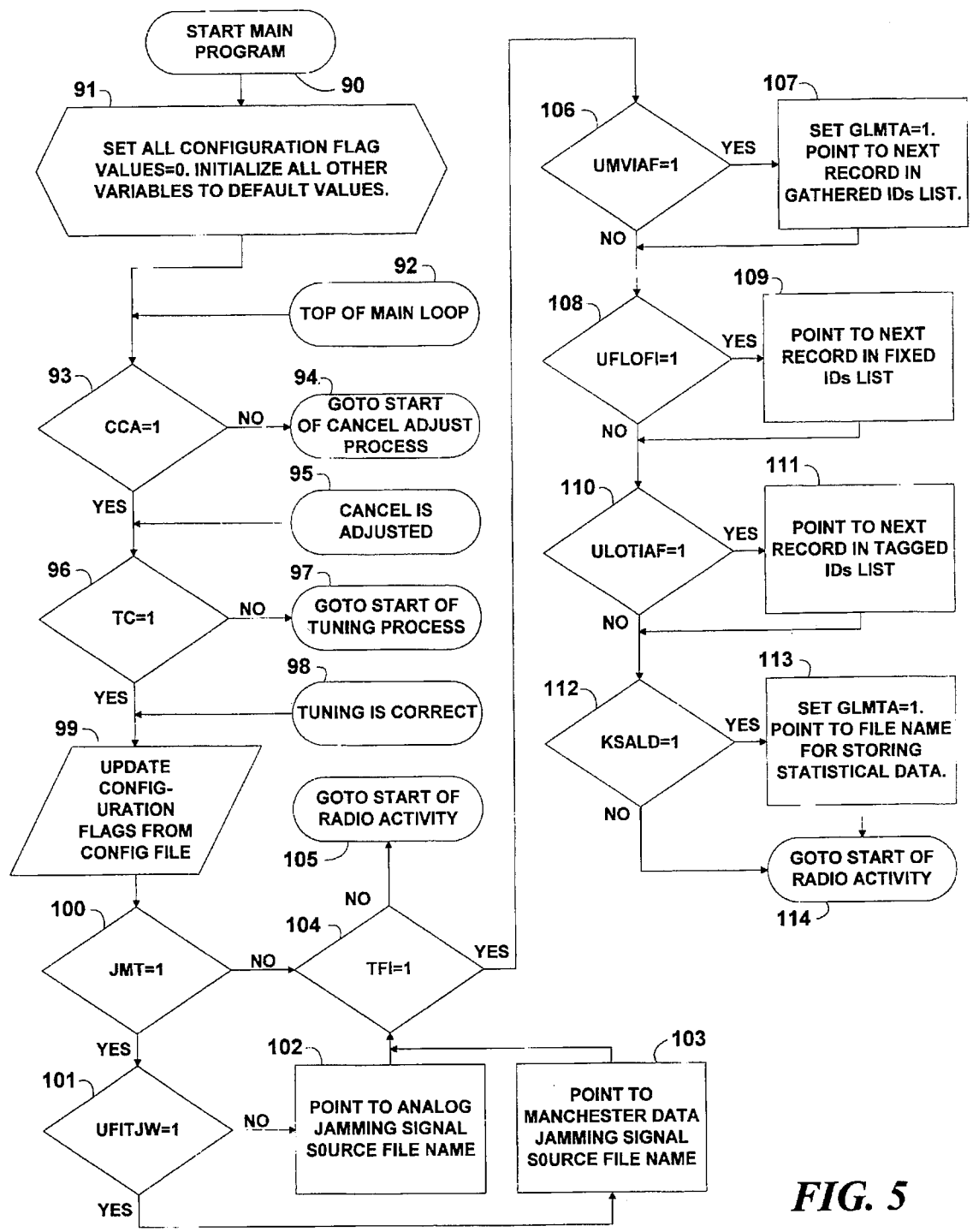
FIG. 5 is a simplified flow chart of the main loop of the controlling software program of the preferred embodiment of the invention.

Main loop of program (FIG. 5)

Following the paths through the flowcharts in these drawings, it can be seen that in FIG. 5, program flow point 90 indicates the entry point to the software. The initial step taken by the software after starting is to set all of the configuration flag values to zero and initialize all other variables to their default values, as seen in preparation block 91. Once this is completed, the software enters the main program loop, as indicated by the position of flow point 92 which feeds decision block 93 in parallel with preparation block 91. The software eventually re-enters the program main loop through flow point 92 as described later in this section.

In decision block 93 the software determines whether the circuits of cancellation controller 35 are considered to be properly adjusted. Variable CCA is equal to value one if this is true. If the value of CCA is equal to zero, then the software branches to flow point 94. Flow point 94 directs the software to flow point 115 shown in FIG. 5a, which is the starting point of the cancel adjust process described later in this section. In this case, once the process of adjusting the circuits of cancellation controller 35 is completed, the software re-enters the main loop through flow point 95, flowing from there to decision block 96. If the value of CCA is equal to one when the software enters decision block 93, then the software branches to decision block 96.

In decision block 96 the software determines whether the jamming reverse control channel receiver 33, jamming reverse control channel transmitter 36, and jamming forward control channel receiver 52 are considered to be properly tuned to the same control channel frequency as the cell sector in which the invention is operating. Variable TC is equal to value one if this is true. If the value of TC is equal to zero, then the software branches to flow point 97. Flow point 97 directs the software to flow point 162 shown in FIG. 5c, which is the starting point of the tuning process described later in this section. In this case, once the process of tuning the radio equipment is completed, the software re-enters the main loop through flow point 98, flowing from there to input/output block 99. If the value of TC is equal to one when the software enters decision block 96, then the software branches to input/output block 99.

In input/output block 99 the software updates its configuration flags from a configuration file stored on magnetic data storage medium 259. After this update is completed, the software flows to decision block 100.

In decision block 100 the software determines if configuration flag JMT is set to value one (indicating that the invention is configured to jam mobile transmissions). If this is false, the software branches to decision block 104. If configuration flag JMT is set to value one when the software enters decision block 100, the software branches to decision block 101.

In decision block 101 the software determines if configuration flag UFITJW is set to value one (indicating that the invention is configured to use false IDs to jam with). If this is false, the software branches to process block 102 where a pointer is set to indicate which analog jamming signal file to use as a source. From here the software flows to decision block 104. If configuration flag UFITJW is set to value one when the software enters decision block 101, the software branches to process block 103 where a pointer is set to indicate which Manchester data jamming signal file to use as a source. From here the software flows to decision block 104.

In decision block 104 the software determines if configuration flag TFI is set to value one (indicating that the invention is configured to transmit false IDs). If this is false, the software branches to flow point 105. Flow point 105 directs the software to flow point 190 shown in FIG. 5d, which is the starting point of the radio activity loop described later in this section. If configuration flag TFI is set to value one when the software enters decision block 104, the software branches to decision block 106.

In decision block 106 the software determines if configuration flag UMVIAF is set to value one (indicating that the invention is configured to use modified valid IDs as false IDs). If this is false, the software branches to decision block 108. If configuration flag UMVIAF is set to value one when the software enters decision block 106, the software branches to process block 107. In process block 107 the software sets configuration flag GLMTA to value one and sets a pointer to indicate the next record location in a list of gathered IDs. From here the software flows to decision block 108.

In decision block 108 the software determines if configuration flag UFLOFI is set to value one (indicating that the invention is configured to use a fixed list of false IDs). If this is false, the software branches to decision block 110. If configuration flag UFLOFI is set to value one when the software enters decision block 108, the software branches to process block 109. In process block 109 the software sets a pointer to indicate the next record location in a fixed list of false IDs. From here the software flows to decision block 110.

In decision block 110 the software determines if configuration flag ULOTIAF is set to value one (indicating that the invention is configured to use a list of tagged IDs as false IDs). If this is false, the software branches to decision block 112. If configuration flag ULOTIAF is set to value one when the software enters decision block 110, the software branches to process block 111. In process block 111 the software sets a pointer to indicate the next record location in a fixed list of tagged IDs. From here the software flows to decision block 112.

In decision block 112 the software determines if configuration flag KSALD is set to value one (indicating that the invention is configured to keep statistics and log data). If this is false, the software branches to flow point 114. If configuration flag KSALD is set to value one when the software enters decision block 112, the software branches to process block 113. In process block 113 the software sets configuration flag GLMTA to value one and sets a pointer to indicate the file name where statistics and log data will be stored. From here the software flows to flow point 114. Flow point 114 directs the software to flow point 190 shown in FIG. 5d, which is the starting point of the radio activity loop described later in this section.

Figure 5A:
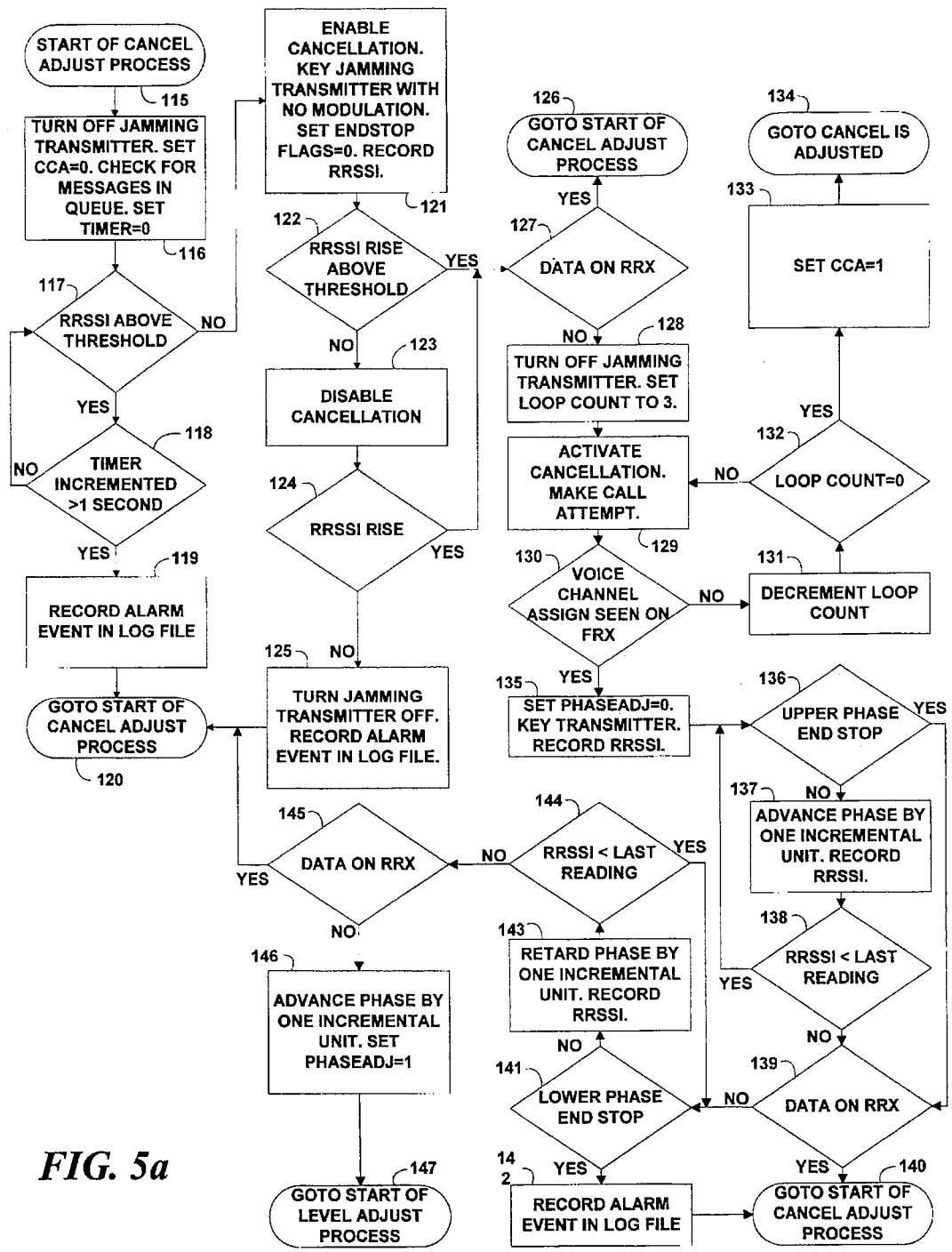
FIG. 5a is a simplified flow chart of the automatic phase adjustment process of the cancellation control circuits according to the preferred embodiment of the invention.

Phase adjustment process (FIG. 5a)

As detailed above, flow point 94 directs the software to flow point 115 shown in FIG. 5a, which is the starting point of the cancel adjust process described here. It can be seen that in FIG. 5a, program flow point 115 indicates the entry point to the software. As shown in process block 116, the initial step taken by the software after entering this point is to unkey ("turn off") jamming reverse control channel transmitter 36 via transmitter keying control circuit 254. Once this is completed, the software sets variable CCA to value zero (indicating that the circuits of cancellation controller 35 are not considered to be adjusted properly, checks for incoming messages in its message queue, and sets its timer to zero. From here the software flows to decision block 117.

In decision block 117 the software determines whether the reverse channel receiver RSSI is considered to be above a threshold value. This threshold value is set to indicate that sufficient RF energy is present to suspect that a mobile is transmitting on the reverse control channel. If the value of receiver RSSI is considered to be above the threshold value, then the software branches to decision block 118. Here the software enters a tight loop between decision block 118 and decision block 117. If the timer value (which is continually incrementing by some small portion of a second based on real time) has become greater than one second, the software (as seen in decision block 118) proceeds to process block 119 where an alarm event is recorded in the log file pointed to by process block 113 prior to the software returning to the start of the cancel adjust process (as seen in flow point 120). Otherwise, the software loops back to decision block 117 to re-evaluate whether the reverse channel receiver RSSI value has dropped below the threshold value (indicating that the mobile which was transmitting on the reverse control channel has stopped transmitting). If the value finally drops below the threshold value before one second of time passes, the software branches from decision block 117 to process block 121 where the software begins the process of performing the adjustment of the phase cancellation circuit of cancellation controller 35. The purpose of decision block 118 and decision block 117 is to insure that the invention does not attempt to adjust its phase cancellation circuit while a mobile phone is already transmitting.

In process block 121 the software enables the cancellation signal by controlling output level controller circuit 73 (via control and data bus 40), causing output level controller circuit 73 to change the output level from an amplitude of zero to the amplitude which previously was used to successfully cancel the jamming signal. The software then keys jamming reverse control channel transmitter 36 via transmitter keying control circuit 254. At this point, the software insures that the transmitted signal is not modulated by controlling modulation signals combiner circuit 251 in such a way as to cause it to inhibit signals originating from 10 Khz Manchester encoded data generator circuit 253 and variable frequency signal generator circuit 250 from reaching modulation level limiter circuit 252. The software then sets the upper and lower end stop values to zero (indicating that the hardware phase adjustment end stops have not been reached).

The software then records the value of the RSSI signal seen on jamming receiver RSSI signal line 34 by reverse channel RSSI A/D converter 55. This value will be used as a reference value for comparison later. This reference RSSI value is used by the software to determine whether changes in phase adjustment of the low level copy of the jamming signal as it passes through phase controller circuit 71 improve the effectiveness of the cancellation of the original jamming signal. It is assumed that a lower RSSI value here will indicate that the phase cancellation has improved. The goal is to reduce the RSSI to a level which indicates that no RF signal is being received by jamming reverse control channel receiver 33 (original jamming signal has been completely canceled in impedance matching device 29).

The software then proceeds to decision block 122 where it is determined whether the value of the RSSI seen on jamming receiver RSSI signal line 34 by reverse channel RSSI A/D converter 55 has risen above the threshold which indicates that a mobile is operating on the reverse control channel. If so, the software immediately proceeds to decision block 127.

If the value of the RSSI is below this threshold when the software arrives at decision block 122, the software proceeds to process block 123 where it disables the cancellation signal by controlling output level controller circuit 73 (via control and data bus 40), causing output level controller circuit 73 to change the output level from the amplitude which previously was used to successfully cancel the jamming signal to an amplitude of zero. This should cause a corresponding rise in the RSSI value (indicating the uncancelled presence of the original jamming signal). From decision block 122 the software proceeds to decision block 124 to test whether the expected rise in the RSSI value has occurred. If so, the software proceeds to decision block 127. Otherwise, the software proceeds to process block 125 where it immediately unkeys jamming reverse control channel transmitter 36 via transmitter keying control circuit 254, then records an alarm event in the log file pointed to by process block 113 before returning to the start of the cancel adjust process via flow point 120.

When the software reaches decision block 127 (via decision block 122 or decision block 124), another test is applied before proceeding. In decision block 127 it is determined whether data is being decoded from the reverse channel received signal by reverse channel baseband A/D converter 60 of jamming reverse control channel receiver 33. If this is true, it is an indication that a mobile is sending a normal data message to the cell sector control channel receiver 31. This would indicate the need to start the adjustment process over since it interferes with the necessary phase adjustment feedback measurements. In this case the software returns to the start of the cancel adjust process via flow point 126.

If no data is being decoded from the reverse channel received signal when the software reaches decision block 127, the software proceeds to process block 128 where the software begins a series of call attempt tests to determine if the cancellation is adjusted properly. In process block 128 the software unkeys jamming reverse control channel transmitter 36 via transmitter keying control circuit 254, then sets a loop count to the value three.

Leaving process block 128 the software enters process block 129 where it activates the cancellation circuits and makes a test call attempt (using jamming reverse control channel transmitter 36 and jamming forward control channel receiver 52 as a mobile phone). The software then monitors forward channel baseband A/D converter 67 of jamming forward control channel receiver 52 via control and data bus 40 to see if a voice channel assignment was given on the forward channel received signal for the test call attempt, as seen in decision block 130.

If a voice channel assignment was not given on the forward channel received signal for the test call attempt, it is an indication that the cancellation of the original jamming signal is sufficient to prevent cell sector control channel receiver 31 from receiving the signal. In this case the software proceeds to process block 131 where it decrements the loop count variable (indicating that another test call attempt has been successfully canceled. From here the software tests to see if three successfully canceled call attempts have been made. This is done in decision block 132. If less than three successfully canceled call attempts have been made, the software returns to process block 129, reentering the loop. If three successfully canceled call attempts have been made, the software proceeds from decision block 132 to process block 129, where variable CCA is given the value of one (indicating that the cancellation adjustment is complete). From here the software reenters the program main loop at flow point 95 via flow point 134.

If a voice channel assignment was given on the forward channel received signal for any of the test call attempts, it is an indication that the cancellation of the original jamming signal is insufficient to prevent cell sector control channel receiver 31 from receiving the signal. In this case the software proceeds from decision block 130 to process block 135 where it sets variable PHASEADJ to a value of zero (indicating that the phase needs adjustment) then keys jamming reverse control channel transmitter 36 via transmitter keying control circuit 254 and stores for reference a record of the reverse channel receiver RSSI (RRSSI) now seen for later comparison.

In decision block 136, where the actual phase adjustment process begins, the software determines whether the upper phase end stop flag indicates that the hardware is at upper end stop. If so, the software proceeds directly to decision block 139 where it is determined if data is being decoded on the reverse channel received signal (indicating a mobile in operation on reverse control channel). If data is being decoded, the software returns to the start of the cancel adjust process via flow point 140. If the upper end stop flag indicates that the hardware is not at upper end stop when the software enters decision block 136, the software proceeds to advance the phase of the low level copy of the jamming signal by one incremental unit, then record the new RRSSI as seen in process block 137.

After recording the new RRSSI, the software compares this reading to the last reference RRSSI in decision block 138. If the new RSSI value is lower than that of the reference RRSSI, the software reassigns the new RRSSI as the reference RRSSI, then re-enters the loop at the input to decision block 136. The software will continue in this loop until the new RSSI value is not lower than that of the reference RRSSI when the software enters decision block 138. When this occurs, the software then proceeds to decision block 139 where it is determined if data is being decoded on the reverse channel received signal (indicating a mobile in operation on reverse control channel). If data is not being decoded, the software proceeds to decision block 141.

In decision block 141, the software determines whether the lower phase end stop flag indicates that the hardware is at lower end stop. If so, the software proceeds directly to process block 142 where it is records an alarm event in the log file, then returns to the start of the cancel adjust process via flow point 140. If the lower end stop flag indicates that the hardware is not at lower end stop when the software enters decision block 141, the software proceeds to retard the phase of the low level copy of the jamming signal by one incremental unit, then records the new RRSSI in process block 143.

After recording the new RRSSI, the software compares this reading to the last reference RRSSI in decision block 144. If the new RSSI value is lower than that of the reference RRSSI, the software reassigns the new RRSSI as the reference RRSSI, then re-enters the loop at the input to decision block 141. The software will continue in this loop until the new RSSI value is not lower than that of the reference RRSSI when the software enters decision block 144. When this occurs, the software then proceeds to decision block 145 where it is determined if data is being decoded on the reverse channel received signal (indicating a mobile in operation on reverse control channel). If data is being decoded when the software enters decision block 145, the software returns to the start of the cancel adjust process via flow point 120. If data is not being decoded, the software proceeds to process block 146.

Figure 5B:
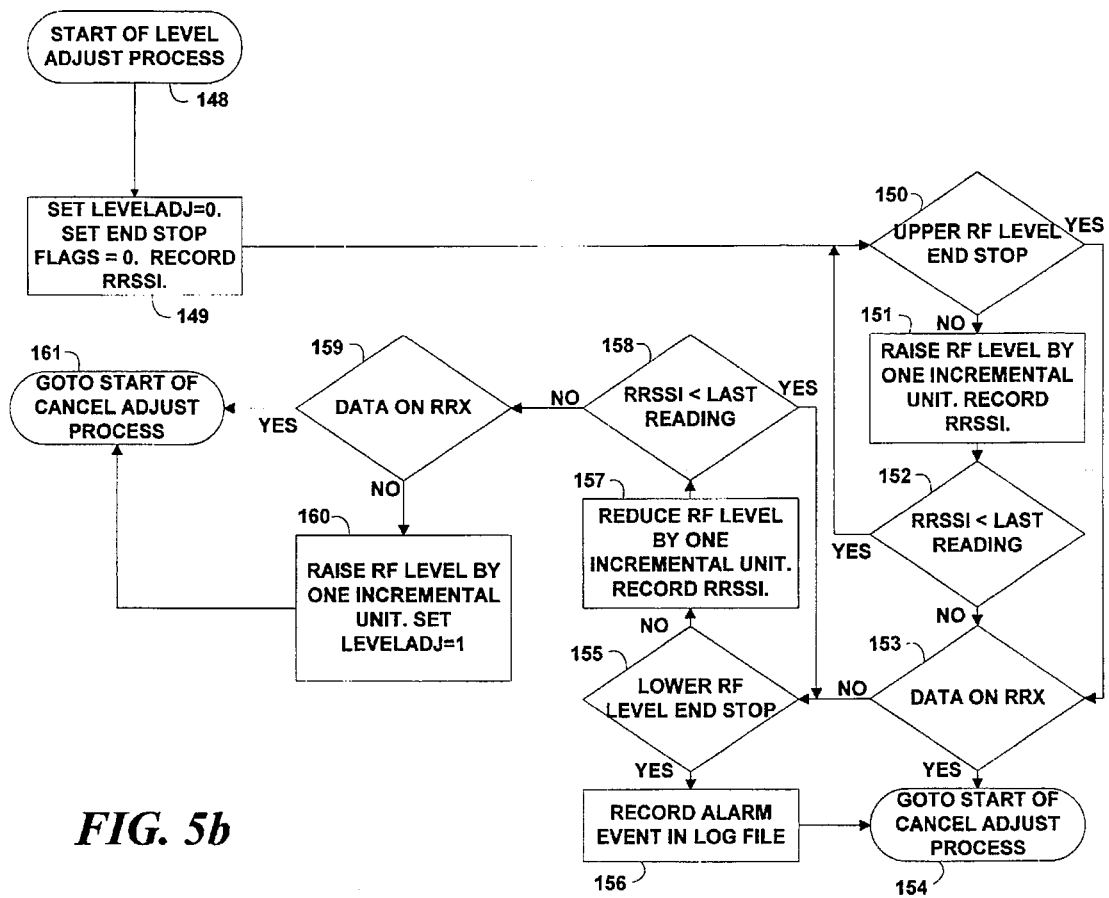
FIG. 5b is a simplified flow chart of the automatic level adjustment process of the cancellation control circuits according to the preferred embodiment of the invention.

In process block 146 the software advances the phase of the low level copy of the jamming signal by one incremental unit, then sets the value of variable PHASEADJ to one (indicating that the phase adjustment process of the cancellation adjustment is complete), before proceeding via flow point 147 to flow point 148 (the start of the level adjust process seen in FIG. 5b).

Level adjustment process (FIG. 5b)

Now referring to FIG. 5b, it can be seen that flow point 148 is the entry point for the start of the level adjust process. As seen in process block 149, the software immediately sets the value of variable LEVELADJ to zero (indicating that the output level controller circuit 73 in cancellation controller 35 is not considered to be adjusted properly). The software then stores for reference a record of the reverse channel receiver RSSI (RRSSI) now seen for later comparison. From process block 149, the software proceeds to decision block 150.

In decision block 150, where the actual level adjustment process begins, the software determines whether the upper level end stop flag indicates that the hardware is at upper end stop. If so, the software proceeds directly to decision block 153 where it is determined if data is being decoded on the reverse channel received signal (indicating a mobile in operation on reverse control channel). If data is being decoded, the software returns to the start of the cancel adjust process via flow point 154. If the upper end stop flag indicates that the hardware is not at upper end stop when the software enters decision block 150, the software proceeds to raise the RF level of the low level copy of the jamming signal by one incremental unit, then record the new RRSSI as seen in process block 151.

After recording the new RRSSI, the software compares this reading to the last reference RRSSI in decision block 152. If the new RSSI value is lower than that of the reference RRSSI, the software reassigns the new RRSSI as the reference RRSSI, then re-enters the loop at the input to decision block 150. The software will continue in this loop until the new RSSI value is not lower than that of the reference RRSSI when the software enters decision block 152. When this occurs, the software then proceeds to decision block 153 where it is determined if data is being decoded on the reverse channel received signal (indicating a mobile in operation on reverse control channel). If data is not being decoded, the software proceeds to decision block 155.

In decision block 155, the software determines whether the lower level end stop flag indicates that the hardware is at lower end stop. If so, the software proceeds directly to process block 156 where it is records an alarm event in the log file, then returns to the start of the cancel adjust process via flow point 154. If the lower end stop flag indicates that the hardware is not at lower end stop when the software enters decision block 155, the software proceeds to reduce the RF level of the low level copy of the jamming signal by one incremental unit, then records the new RRSSI in process block 157.

After recording the new RRSSI, the software compares this reading to the last reference RRSSI in decision block 158. If the new RSSI value is lower than that of the reference RRSSI, the software reassigns the new RRSSI as the reference RRSSI, then re-enters the loop at the input to decision block 155. The software will continue in this loop until the new RSSI value is not lower than that of the reference RRSSI when the software enters decision block 158. When this occurs, the software then proceeds to decision block 159 where it is determined if data is being decoded on the reverse channel received signal (indicating a mobile in operation on reverse control channel). If data is being decoded when the software enters decision block 159, the software returns to the start of the cancel adjust process via flow point 161. If data is not being decoded, the software proceeds to process block 160.

In process block 161 the software raises the RF level of the low level copy of the jamming signal by one incremental unit, then sets the value of variable LEVELADJ to one (indicating that the level adjustment process of the cancellation adjustment is complete), before returning to the start of the cancel adjust process via flow point 161. The reason for returning to the start of the cancel adjust process is that the cancel adjust process (as seen in FIG. 5a) verifies the effectiveness of the cancellation adjustment by performing test call attempts in the program loop of process block 128, process block 129, decision block 130, process block 131, and decision block 132. As described above, if these test call attempts appear to be successfully canceled, then the software re-enters the program main loop at flow point 95 via process block 133 and flow point 134.

Figure 5C:
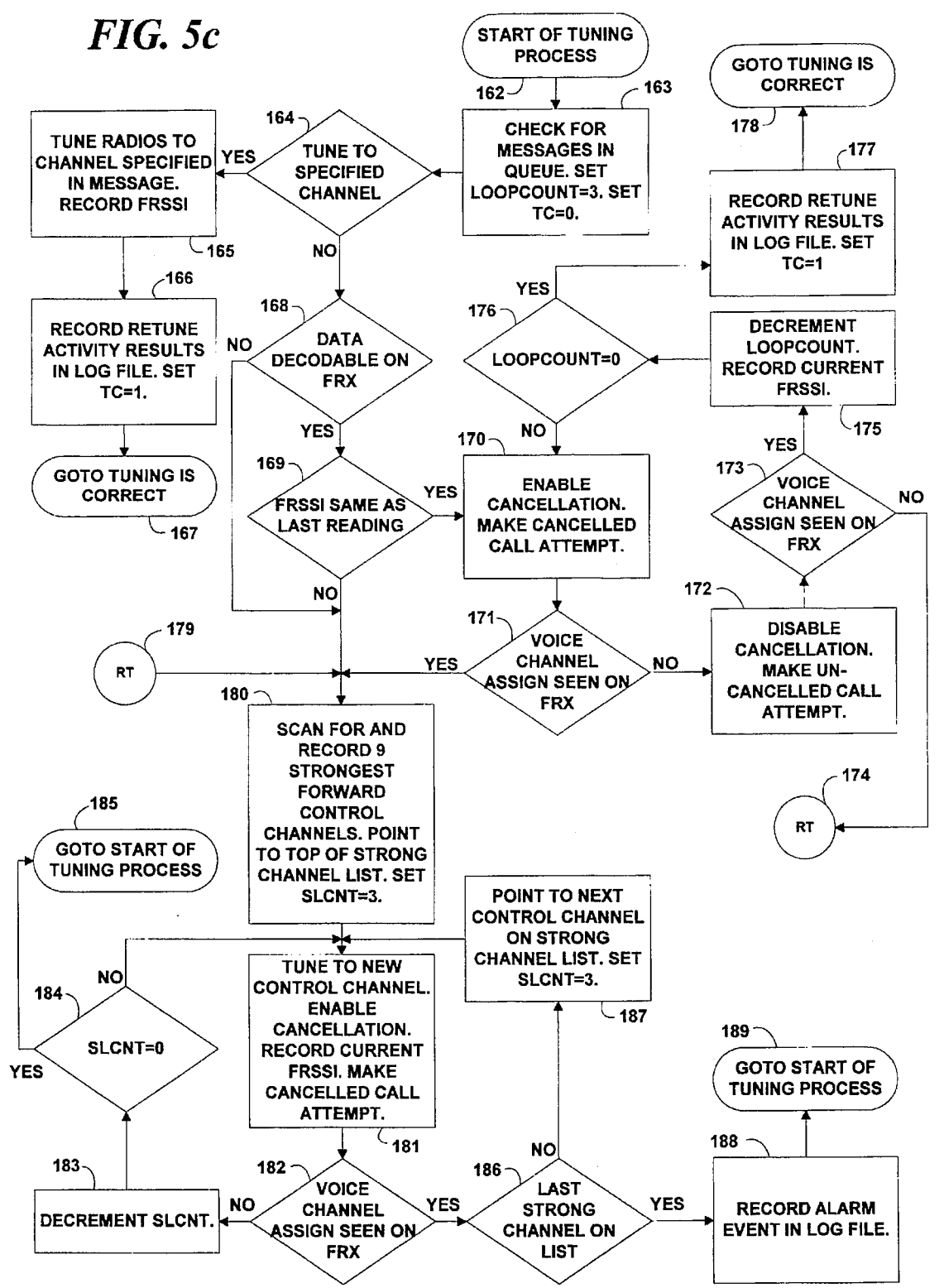
FIG. 5c is a simplified flow chart of the automatic radio tuning process according to the preferred embodiment of the invention.

Radio tuning process (FIG. 5c)

If in the main program loop (shown in FIG. 5) the software enters decision block 96 and determines that the value of variable TC is not equal to one (this indicates the need to tune the radio hardware to a new control channel frequency), the software proceeds via flow point 97 to flow point 162 (start of the tuning process shown in FIG. 5c).

The first thing the software does when it enters the tuning process is to check for incoming messages in its message queue as seen in process block 163. It then sets variable loopcount to a value of three and variable TC to value zero. The software then proceeds to decision block 164 where it determines whether a received message has instructed the software to tune the invention's radio hardware to a specified channel frequency.

If the software received a specific tuning message, it proceeds from decision block 164 to process block 165, where it force tunes the radio hardware to the specified channel frequency and records the forward channel RSSI (FRSSI) as it is seen through forward channel RSSI A/D converter 70 via control and data bus 40. The software then proceeds to process block 166 where it records the retune activity results in the log file, sets the value of TC to one (indicating that the tuning is completed), and re-enters the main loop of the program at flow point 98 via flow point 167.

If the software has not received a specific tuning message, it proceeds from decision block 164 to decision block 168, where it determines whether data is being decoded on the forward channel received signal (FRX). If data is being decoded, then the invention's radio hardware is tuned to an operating control channel. In order to determine if the channel the invention is tuned to is the same as the one being used by the cell sector in which the invention is operating, the software enters decision block 169. Here the software compares the FRSSI it sees with a reference FRSSI recorded earlier when the tuning was known to be correct. If these FRSSIs compare as substantially equal, it is assumed that the invention's radio hardware is tuned to the proper control channel frequency. If this is true, the program proceeds to process block 170 to begin verifying (with canceled and uncancelled test call attempts) whether the tuning has been effective. This testing process is described in more detail later in this section.

If, when the software enters decision block 169, it is determined that these FRSSIs do not compare as substantially equal, it is assumed that the invention's radio hardware is tuned to an incorrect control channel frequency. In this case the software proceeds to the top of the retune loop at the input of process block 180. The software also proceeds directly to this point (input of process block 180) from decision block 168 if no data is decodable when the software enters decision block 168.

In process block 180 the software causes jamming forward control channel receiver 52 to scan through all of the cellular control channel frequencies, recording and keeping a list of the FRSSI seen on each channel. This list is converted to a list of the nine strongest control channels seen (based on their FRSSIs). A pointer is set to indicate the next channel on this strong channel list. The software then sets variable SLCNT to value three. With this accomplished, the software then proceeds to process block 181.

In process block 181 the software tunes the invention's radio hardware to the control channel frequency pointed to in the strong channel list. Cancellation circuits are then enabled and the current FRSSI is recorded as a reference. A call attempt is then made with the cancellation circuits active. From here the software proceeds to decision block 182.

In decision block 182 it is determined whether a voice channel assignment (in response to the canceled test call attempt) is decoded on the FRX via forward channel baseband A/D converter 67 via control and data bus 40. If a voice channel was assigned to the canceled test call attempt, it is assumed that the invention's radio hardware is tuned to an improper control channel (causing the cancellation to fail).

If this is the case, the software enters decision block 186 to determine whether the last record of the strong channel list has been reached. If it has, the software records and alarm event in the log file (in process block 188), then returns to the start of the tuning process via flow point 189 to restart the re-tune process. If, when entering decision block 186, the software determines that it has not reached the last record of the strong channel list, it proceeds to process block 187 where the strong channel list pointer is moved to the next channel on the list. Before re-entering the top of this loop at the input of process block 181, the software resets variable SLCNT to value three. The software will continue in this loop until the end of the strong channel list is reached or a test call is made for which no voice channel assignment is decoded.

If, when the software enters decision block 182, no voice channel assignment is decoded for the canceled test call attempt, the software proceeds to process block 183 where it decrements the value of variable SLCNT. From there the software proceeds to decision block 184 where it is determined whether the value of variable SLCNT is zero (indicating that three canceled test call attempts have been successfully been completed without receiving voice channel assignments). If the value of variable SLCNT is not equal to zero when the software enters decision block 184, the software re-enters this loop through the input to process block 181. The software will continue in this loop until the value of variable SLCNT is equal to zero when the software enters decision block 184, whereupon the software returns to the top of the tuning process at flow point 162 via flow point 185. This is done to allow the process to verify proper tuning using canceled and uncancelled test call attempts.

Now the process of using canceled and uncancelled test call attempts to verify proper tuning of will be described. This process begins when the FRSSI comparison of decision block 169 indicates that the FRSSIs being compared are substantially equal in value. When this is the case, the software proceeds to process block 170 where the cancellation circuits are enabled and a test call attempt is made on the channel to which the invention's radio hardware is tuned. The software then checks to see if a voice channel assignment is decoded on the FRX in decision block 171. If a voice channel assignment is decoded in response to the canceled test call attempt (indicating that the attempt was not successfully canceled), the software proceeds directly to the top of the retune loop at the input to process block 180. If, however, no voice channel assignment is decoded in response to the canceled test call attempt (indicating successful cancellation of the test call attempt), the software proceeds from decision block 171 to process block 172.

In process block 172 the software disables the cancellation circuits, then makes an uncancelled test call attempt. If the invention's radio hardware is correctly tuned to the control channel of the cell sector in which it is operating, this call attempt should receive a voice channel assignment.

This is tested by the software in decision block 173. If no voice channel assignment is decoded in response to the uncancelled test call attempt, the software proceeds directly from decision block 173 to the top of the retune loop at the input to process block 180 via flow point 174 and flow point 179. If, however, no voice channel assignment is decoded in response to the uncancelled test call attempt (indicating that the test call attempt was seen and responded to on the local cell sector's operating control channel frequency), the software proceeds from decision block 173 to process block 175.

In process block 175 the software decrements the value of variable loopcount and records the FRSSI for later reference before proceeding to decision block 176. In decision block 176, the software determines if the value of variable loopcount is zero. If the value of variable loopcount is not equal to zero, the software re-enters this testing loop at the top of process block 170. The software will remain in this testing loop until the value of variable loopcount is equal to zero when the software enters decision block 176. When this is the case, the software proceeds from decision block 176 to process block 177 where it records the retune activity results in the log file, sets the value of variable TC to one (indicating that the tuning is completed), then re-enters the main program loop at flow point 98 via flow point 178.

Figure 5D:
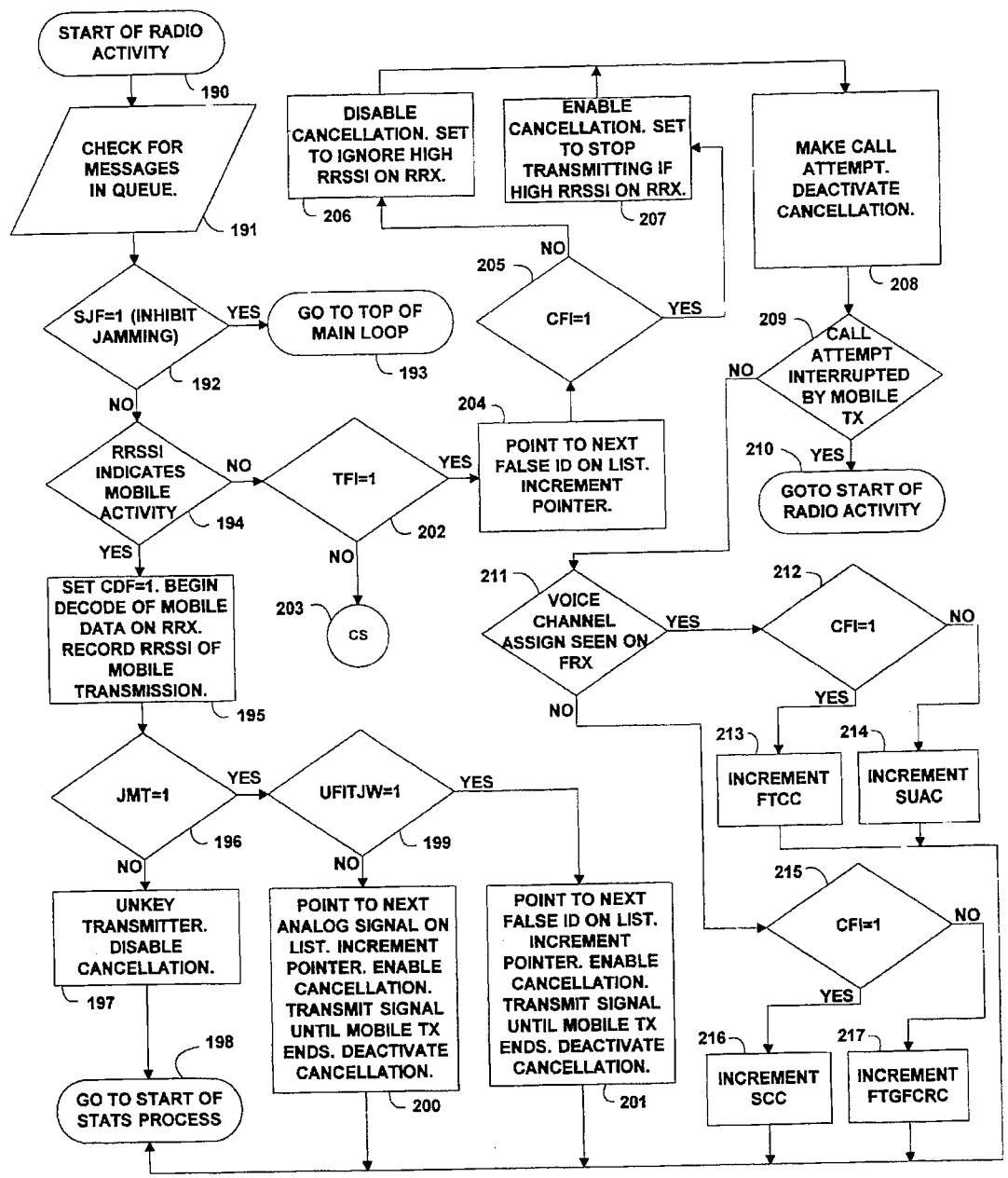
FIG. 5d is a simplified flow chart of the radio activity control process according to the preferred embodiment of the invention.

Radio activity control process (FIG. 5d)

Now referring to FIG. 5, it is seen that the software flows from either flow point 105 or flow point 114 to enter the radio activity loop of the program which is entered through flow point 190 (seen in FIG. 5d). Once the software enters the radio activity loop, it immediately checks for messages in its incoming message queue as seen in input/output block 191.

After the incoming messages have been received, the software proceeds to decision block 192 where it determines if variable SJF has a value of one (indicating that the command has been received to immediately stop jamming). If this is so, the software immediately re-enters the top of the main program loop via flow point 193 and flow point 92, bypassing any radio activity.

If variable SJF is not equal to value one, the software proceeds from decision block 192 to decision block 194, where it compares the value of RRSSI to a reference value to determine whether a mobile is currently transmitting. If the RRSSI value exceeds the reference value (indicating that a mobile is transmitting), the software proceeds to process block 195.

In process block 195 the software sets the value of variable CDF to one (indicating that mobile data is currently being decoded successfully) as it begins decoding the data. The software also records the RRSSI of the mobile transmission before proceeding to decision block 196.

In decision block 196, the software determines whether variable JMT has a value of one (indicating that the configuration sanctions the jamming of mobile transmissions). If this is not so, the software proceeds to process block 197 where it unkeys the transmitter and disables the cancellation circuits before proceeding to the start of the stats process via flow point 198 and flow point 260 (shown in FIG. 5e). If the value of JMT is one when the software enters decision block 196, the software proceeds to decision block 199.

In decision block 199, the software determines whether variable UFITJW has a value of one (indicating that the configuration sanctions using false IDs to jam with). If this is not so, the software proceeds to process block 200 where it points to the next analog signal on the list in the jamming signal source file, incrementing the pointer. The software then enables the cancellation circuits, keys the transmitter for the duration of the mobile transmission, and finally disables the cancellation circuits before proceeding to the start of the stats process via flow point 198 and flow point 260 (shown in FIG. 5e). If the value of UFITJW is one when the software enters decision block 199, the software proceeds to process block 201 where it points to the next false ID on the list in the jamming signal source file, incrementing the pointer. The software then enables the cancellation circuits, keys the transmitter for the duration of the mobile transmission, and finally disables the cancellation circuits before proceeding to the start of the stats process via flow point 198 and flow point 260 (shown in FIG. 5e).

If, when the software enters decision block 194, the RRSSI indicates no current mobile activity, the software proceeds to decision block 202 where it is determined whether variable TFI has the value one (indicating that the invention is configured to transmit false IDs). If the value of variable TFI is not one, the software proceeds to enter the stats process (shown in FIG. 5e) at flow point 281 via flow point 203. If variable TFI has the value one when the software enters decision block 202, the software proceeds to process block 204.

In process block 204, the software points to the next false ID on the list in the jamming signal source file, incrementing the pointer before proceeding to decision block 205. In decision block 205 it is determined whether variable CFI has the value one (indicating that the invention is configured to use cancellation on false ID transmissions). If so, the software enables the cancellation circuits and set a flag to immediately stop transmitting a false call attempt if the RRSSI on the reverse control channel exceeds a threshold as shown in process block 207. If, when the software enters decision block 205, it is determined whether variable CFI does not have the value one (indicating that the invention is configured not to use cancellation on false ID transmissions), the software sets a flag to continue transmitting a false call attempt even if the RRSSI on the reverse control channel exceeds a threshold as shown in process block 206.

The software enters process block 208 through either process block 206 or process block 207. In process block 208 the software makes a call attempt using a false ID then insures that the cancellation circuits are deactivated. If the call attempt is interrupted by a mobile transmission (as determined in decision block 209), the software returns to the start of the radio activity loop via flow point 210. If the call attempt is not interrupted by a mobile transmission (as determined in decision block 209), the software from decision block 209 to decision block 211.

In decision block 211, the software determines whether a voice channel assignment in response to the call attempt was decoded on the forward control channel. If so, the software proceeds to decision block 212 to evaluate whether variable CFI has the value one (indicating that the cancellation circuits were activated during the call attempt). If the value of CFI is one, the software proceeds to increment the value of variable FTCC (failure to cancel counter) in process block 213, then proceeds to enter the stats process (shown in FIG. 5e) at flow point 260 via flow point 198. If the value of CFI is not one when the software enters decision block 212, the software proceeds to increment the value of variable SUAC (successful uncancelled attempts counter) in process block 214, then proceeds to enter the stats process (shown in FIG. 5e) at flow point 260 via flow point 198.

If, when entering decision block 211, the software determines that no voice channel assignment was decoded in response to the call attempt, the software proceeds to decision block 215 to evaluate whether variable CFI has the value one (indicating that the cancellation circuits were activated during the call attempt). If the value of CFI is one, the software proceeds to increment the value of variable SCC (successful cancellations counter) in process block 216, then proceeds to enter the stats process (shown in FIG. 5e) at flow point 260 via flow point 198. If the value of CFI is not one when the software enters decision block 215, the software proceeds to increment the value of variable FTG-FCRC (failure to get forward channel response counter) in process block 217, then proceeds to enter the stats process (shown in FIG. 5e) at flow point 260 via flow point 198.

Figure 5E:
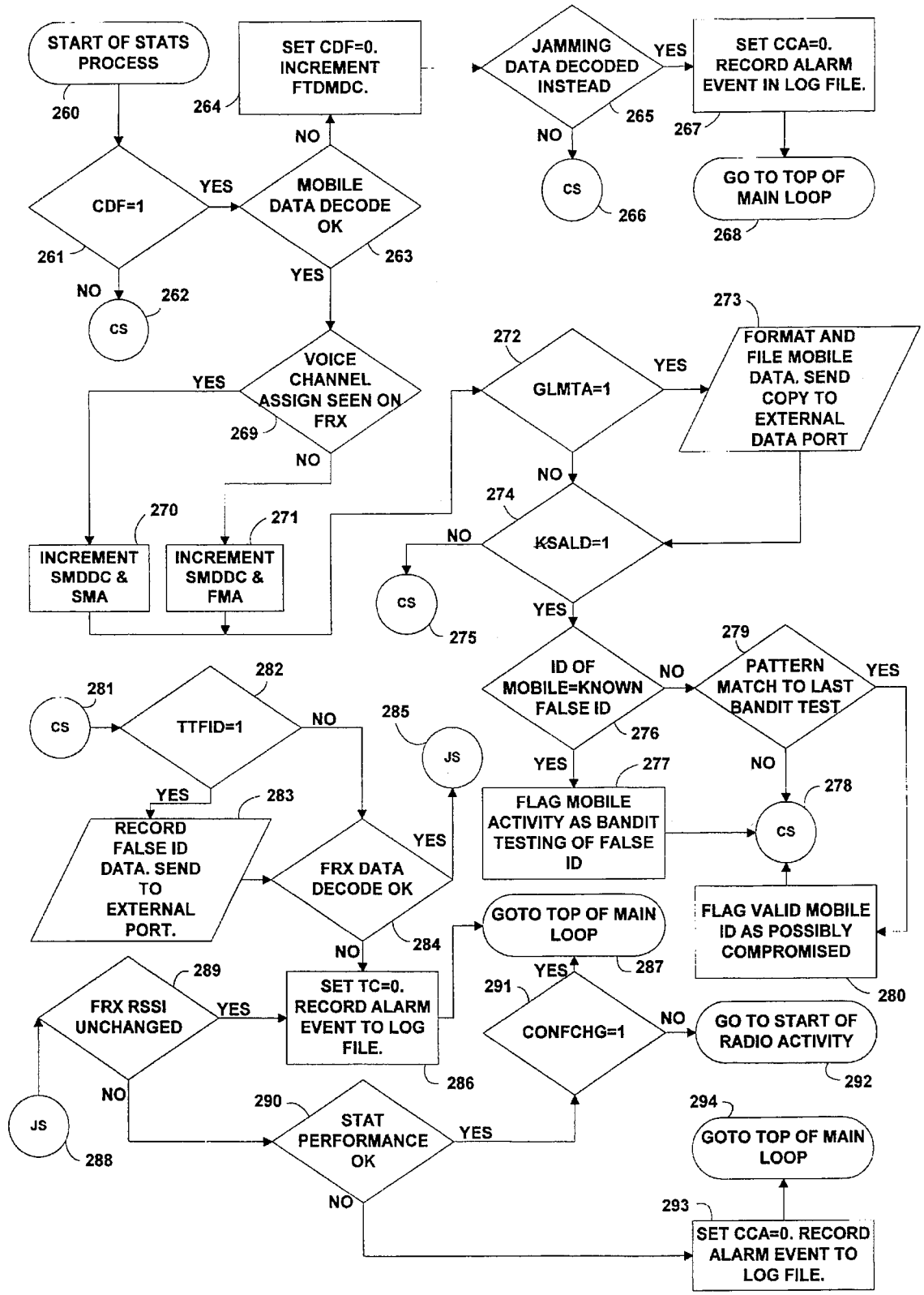
FIG. 5e is a simplified flow chart of the radio activity statistics process according to the preferred embodiment of the invention.

Statistics process (FIG. 5e)

Now referring to FIG. 5e, a simplified flowchart of the radio activity statistics process will be described. The software enters this process via flow point 260. The software proceeds to decision block 261 where it determines if variable CDF has the value one (indicating that the software has currently decoded a mobile data message). If the value of CDF is not one, the software proceeds to decision block 282 via flow point 262 and flow point 281. If the value of CDF is not one when the software enters decision block 261, the software proceeds to decision block 263 where it determines whether the mobile data was successfully decoded. If the data was not decoded successfully, the software sets the value of variable CDF to one and increments the value of variable FTDMDC (failure to decode mobile data counter) before proceeding to decision block 265.

In decision block 265 the software determines if the jamming transmission was accidentally decoded instead of the mobile transmission. If the jamming transmission was decoded, the software (in process block 267) sets the value of variable CCA to zero (indicating that the cancellation circuits are not considered to be properly adjusted), record an alarm in the event log file, then returns to the top of main loop via flow point 268. If the jamming transmission was not decoded, the software proceeds to decision block 282 via flow point 262 and flow point 281.

If the mobile data was successfully decoded when the software enters decision block 263, the software proceeds to decision block 269 where it determines whether a voice channel assignment was seen on the forward control channel in response to the call attempt. If so, the software (in process block 270) increments the value of variable SMDDC (successful mobile data decode counter) and variable SMA (successful mobile attempts counter) before proceeding to decision block 272. If no voice channel assignment was seen when the software enters decision block 269, the software (in process block 271) increments the value of variable SMDDC (successful mobile data decode counter) and variable FMA (failed mobile attempts counter) before proceeding to decision block 272.

In decision block 272 the software determines if variable GLMTA has a value of one (indicating that the invention is configured to gather and log mobile transmission activity). If so, the software proceeds to input/output block 273 where it formats, files, and sends a copy of the decoded mobile data to an external port before proceeding to decision block 274. If variable GLMTA does not have a value of one when the software enters decision block 272, the software proceeds directly from decision block 272 to decision block 274.

In decision block 274 the software determines if the value of variable KSALD is one (indicating that the invention is configured to keep statistics and log data). If the value of variable KSALD is not equal to one, the software proceeds from decision block 274 to decision block 282 via flow point 275 and flow point 281 . If the value of variable KSALD is equal to one when the software enters decision block 274, the software proceeds from decision block 274 to decision block 276.

In decision block 276 the software determines if the decoded mobile ID is that of a known false ID. If so, the software flags the mobile activity as bandit testing in process block 277 before proceeding to decision block 282 via flow point 278 and flow point 281. If the decoded mobile ID is not that of a known false ID when the software enters decision block 276, the software proceeds from decision block 276 to decision block 279.

In decision block 279 the software determines if the pattern of bandit testing is matched in any manner to the current call attempt. If so, the software flags the mobile ID as possibly having been compromised (in process block 280) before proceeding to decision block 282 via flow point 278 and flow point 281. If the pattern of bandit testing is not matched in any manner to the current call attempt when the software enters decision block 279, the software proceeds from decision block 279 to decision block 282 via flow point 278 and flow point 281.

Flow point 281 may be entered by the software from several other flow points in the program. From flow point 281 the software proceeds to decision block 282 where the determination is made whether variable TTFID has value one (indicating that the invention is configured to track transmitted false ID locations and times). If so, the software records the false ID data and sends it to en external port (in input/output block 283) before proceeding to decision block 284. If variable TTFID does not have a value of one when the software enters decision block 282, the software proceeds directly from decision block 282 to decision block 284.

In decision block 284 the software determines if the data on the forward control channel is being properly decoded. If not, the software (in process block 286) sets the value of variable TC to value zero (indicating that the tuning of the radio hardware is not considered to be proper) and records an alarm event in the log file before re-entering the top of the main loop via flow point 287 and flow point 92. If the pattern of bandit testing is not matched in any manner to the current call attempt when the software enters decision block 279, the software proceeds from decision block 279 to decision block 282 via flow point 278 and flow point 281. If the data on the forward control channel is being properly decoded when the software enters decision block 284, the software proceeds to decision block 289 via flow point 275 and flow point 288.

In decision block 289 the software determines if the forward control channel RSSI has changed since the last recorded reference RSSI. If so, the software (in process block 286) sets the value of variable TC to value zero (indicating that the tuning of the radio hardware is not considered to be proper) and records an alarm event in the log file before re-entering the top of the main program loop via flow point 287 and flow point 92. If the forward control channel RSSI has not changed since the last recorded reference RSSI when the software enters decision block 289, the software proceeds from decision block 289 to decision block 290.

In decision block 290 the software determines if the statistical performance of the cell sector and the invention are acceptable. If not, the software (in process block 293) sets the value of variable CCA to value zero (indicating that the cancellation circuits adjustment is not considered to be proper) and records an alarm event in the log file before re-entering the top of the main loop via flow point 294 and flow point 92. If the statistical performances are acceptable when the software enters decision block 290, the software proceeds from decision block 290 to decision block 291.

In decision block 292 the software determines if the variable CONFCHG has a value of one (indicating a command has been received requesting a configuration change). If so, the software re-enters the top of the main program loop via flow point 287 and flow point 92. If the variable CONFCHG does not have a value of one when the software enters decision block 292, the software proceeds from decision block 291 to the start of the radio activity loop via flow point 292.

It can therefore be seen that the software controls the methods which the apparatus of this invention use to provide the functions, features, and advantages claimed herein.

We claim:

1. In a wireless communication system requiring a unique valid identity for each valid mobile unit operating in said wireless communication system, a mobile unit identity security system comprised of:

a jamming transmitter for making a plurality of jamming transmissions on the same frequency or frequencies on which valid mobile units transmit; each of said jamming transmissions containing at least a controlled mobile unit identity specifically selected or created for allowing monitoring of the activities of unauthorized mobile units which utilize or attempt to utilize said controlled mobile unit identities; a modulating circuit with an output in communication with an input of said jamming transmitter for modulating said jamming transmitter with at least said controlled mobile unit identities; said jamming transmissions being made in a manner which insures successful decoding of said controlled mobile identities by unauthorized listening devices.

2. The mobile unit identity security system as set forth in claim 1, wherein said jamming transmissions are made by said jamming transmitter concurrent with normal mobile transmissions made by said valid mobile units; information bearing signals of said jamming transmissions being substantially canceled out prior to the input of decoding circuits of system receivers of said wireless communication system, causing said decoding circuits of said system receivers of said wireless communication system to ignore said jamming transmissions, processing instead said normal mobile transmissions made by said valid mobile units; said substantial canceling of said information bearing signals comprising the introduction of an out of phase and level adjusted replica of said information bearing signals at a point prior to said input of decoding circuits of said system receivers.

3. The mobile unit identity security system as set forth in claim 1 further comprising:

a jamming channel radio frequency receiver in communication with a channel busy/idle status detector;

wherein communications channels of said wireless communication system require inclusion of a valid access code with each normal mobile transmission from said valid mobile units; said jamming transmissions made by said jamming transmitter are non-concurrent with said normal mobile transmissions made by said valid mobile units; said jamming transmissions containing an invalid access code for use with a selected transmission channel causing said jamming transmissions to be ignored by system receivers of said wireless communication system; said jamming transmissions being initiated only when said channel busy/idle status detector determines that an idle condition is present on said selected transmission channel; said jamming transmissions being terminated immediately when said channel busy/idle status detector determines that a busy status is present on said selected transmission channel, allowing decoding circuits of said system receivers of said wireless communication system to properly receive and decode without interference said normal mobile transmissions made by said valid mobile units.

4. The mobile unit identity security system as set forth in claim 1, further comprising:

a radio signal strength monitor receiving a signal strength input signal from a jamming channel radio frequency receiver;

a microprocessor running a program;

said microprocessor having a control output in communication with said jamming transmitter and said jamming channel radio frequency receiver, said control output selecting an operating channel for said jamming transmitter and said jamming channel radio frequency receiver; said program maintaining a list of channels on which to make said jamming transmissions, said jamming transmissions being made on each channel of said list of channels; said radio signal strength monitor sending a first output signal to said microprocessor, said first output signal from said radio signal strength monitor being indicative of the signal level of radio signal being received by said jamming channel radio frequency receiver; said program periodically sending said control output to said jamming channel radio frequency receiver, sequentially causing said jamming channel radio frequency receiver to retune to each selected channel of a predetermined set of operating channels; upon completion of retuning to each said selected channel, said program storing a sample data representing current state of said first output signal from said radio signal strength monitor; said program comparing each said sample data with previously stored instances of said sample data for said selected channel; when said comparison of said sample data indicates an increase in said signal level being received on said selected channel, said program adding said selected channel to said list of channels on which to make said jamming transmissions.

5. The mobile unit identity security system as set forth in claim 1 further comprising:

a microprocessor running a program;

said microprocessor being in communication with said jamming transmitter; said program controlling timing of said jamming transmissions; said program creating or selecting said controlled mobile unit identities contained in said jamming transmissions; said microprocessor being in communication with an externally accessible port; said program accepting input data from said externally accessible port; said input data at least partially comprising operating instructions for said program; said program sending to said externally accessible port, in real time, at least a portion of the information regarding events processed by said program.

6. The mobile unit identity security system as set forth in claim 1, further comprising:

a transmission frequency receiver having an output in communication with a baseband signal processor;

said baseband signal processor having an output in communication with said microprocessor; said transmission frequency receiver receiving normal mobile transmissions of said valid mobile units; said baseband signal processor converting baseband signals received from said transmission frequency receiver into formatted data; said microprocessor receiving from said baseband signal processor said formatted data; said program decoding each said unique valid identity contained in each of said normal mobile transmissions; said program maintaining a jamming transmission identities list, said jamming transmission identities list containing at least one of said controlled mobile unit identities used or to be used in at least a portion of said jamming transmissions; said program comparing said unique valid identities with each of said controlled mobile unit identities contained in at least a portion of said jamming transmission identities list; upon successfully matching one of said unique valid identities with one of said controlled mobile unit identities, said program sending a data message indicative of said matching to said externally accessible port.

7. The mobile unit identity security system as set forth in claim 1, further comprising:

a transmission frequency receiver having an output in communication with a baseband signal processor;

a microprocessor running a program;

said microprocessor in communication with said transmission frequency receiver and said jamming transmitter; said program controlling the timing of said jamming transmissions; said output of said transmission frequency receiver at least partially representing baseband signals; said transmission frequency receiver receiving at least a portion of normal mobile transmissions made by said valid mobile units; said baseband signal processor converting at least a portion of said baseband signals received from said transmission frequency receiver into formatted data; said microprocessor receiving from said baseband signal processor said formatted data; said program calculating from the timing and quantity of said normal mobile transmissions a statistical model representing a traffic pattern of said normal mobile transmissions; said program adjusting said timing of said jamming transmissions to substantially approximate said traffic pattern of said normal mobile transmissions.

8. The mobile unit identity security system as set forth in claim 1, further comprising:

a transmission frequency receiver having an output in communication with a baseband signal processor;

a transmit output power level controller in communication with said jamming transmitter;

a microprocessor running a program;

said microprocessor in communication with said transmission frequency receiver and said jamming transmitter; said microprocessor in communication with said transmit output power level controller; said program controlling the transmit power level of said jamming transmissions; said transmission frequency receiver receiving at least a portion of normal mobile transmissions made by said valid mobile units; said output of said transmission frequency receiver containing a strength indicating signal at least partially representing the received signal strength of said normal mobile transmissions made by said valid mobile units; said baseband signal processor converting at least a portion of said strength indicating signal received from said transmission frequency receiver into formatted data; said microprocessor receiving from said baseband signal processor said formatted data; said program calculating from said formatted data a statistical model representing a received signal strength pattern of said normal mobile transmissions; said program adjusting said transmit power of each of said jamming transmissions based on said received signal strength pattern, causing unauthorized listening devices located within a target reception area to receive said jamming transmissions at signal levels substantially consistent with said received signal strength pattern of said normal mobile transmissions.

9. The mobile unit identity security system as set forth in claim 1, further comprising:

a transmit output power level controller in communication with said jamming transmitter;

a randomizer having an output in communication with an input of said transmit output power level controller;

wherein said randomizer generates a random output power level to be used for each of said jamming transmissions.

10. The mobile unit identity security system as set forth in claim 1, wherein said unique valid identity comprises the combination of a plurality of identity parts, wherein at least one identity part of said plurality of identity parts is unique to only one of said valid mobile units; further comprising:

a microprocessor running a program;

a transmission frequency receiver having an output in communication with a baseband signal processor;

said baseband signal processor having an output in communication with said microprocessor; said transmission frequency receiver receiving normal mobile transmissions of said valid mobile units; said baseband signal processor converting baseband signals received from said transmission frequency receiver into formatted data; said microprocessor receiving from said baseband signal processor said formatted data; said program decoding each said unique valid identity contained in each of said normal mobile transmissions; said program maintaining a jamming transmission identities list, said jamming transmission identities list containing at least one of said controlled mobile unit identities used or to be used in at least a portion of said jamming transmissions; said program creating an invalid identity by:

a) modifying into a false identity part at least a first valid identity part of said combination of a plurality of identity parts, b) replacing original copy of said first valid identity part within said combination of a plurality of identity parts with said false identity part;

wherein at least one said identity part, which is unique to said only one of said valid mobile units, within said combination of a plurality of identity parts remains unchanged;

said program adding said invalid identity to said jamming transmission identities list.

11. The mobile unit identity security system as set forth in claim 1, wherein at least some of said jamming transmissions containing said controlled mobile unit identities are prematurely terminated, preventing said unauthorized listening devices from properly decoding a complete copy of said controlled mobile unit identities.

12. The mobile unit identity security system as set forth in claim 1, said wireless communication system comprising at least one call setup channel for authentication and assignment of a valid call to a conversation channel; said wireless communication system further comprising at least one said conversation channel; each said call setup channel of said wireless communication system comprising a system receiver and a system transmitter, each said call setup channel requiring inclusion of a valid access code with each normal mobile transmission from said valid mobile units; further comprising:

a jamming channel radio frequency receiver in communication with a channel busy/idle status detector; said channel busy/idle status detector having a status output in communication with said jamming transmitter; said jamming channel radio frequency receiver receiving transmissions containing at least partially an indication of the busy or idle status of said call setup channel;

said jamming transmissions made by said jamming transmitter on said call setup channel are non-concurrent with said normal mobile transmissions made by said valid mobile units; said jamming transmissions containing said valid access code for use with a selected transmission channel causing said jamming transmissions to be properly decoded by said system receivers of said wireless communication system; said system transmitter of said call setup channel responding with transmission of an assignment to said conversation channel; said jamming transmissions being initiated only when said channel busy/idle status detector determines that an idle condition is present on said selected transmission channel.

13. The mobile unit identity security system as set forth in claim 12 further comprising:

a variable frequency generator with an output in communication with an input of said modulating circuit;

a microprocessor running a program;

a transmission frequency receiver having an output in communication with a baseband signal processor;

said baseband signal processor having an output in communication with said microprocessor; said transmission frequency receiver receiving transmissions from said system transmitter; said baseband signal processor converting baseband signals received from said transmission frequency receiver into formatted data; said microprocessor receiving from said baseband signal processor said formatted data; said program decoding said assignment to said conversation channel; wherein said program, upon decoding of said assignment to said conversation channel, tunes said jamming transmitter to said conversation channel; said modulating circuit modulating said jamming transmitter now transmitting on said conversation channel with baseband signals from said variable frequency signal generator.

14. The mobile unit identity security system as set forth in claim 13, wherein said wireless communication system requires transmission of a personal identification number on said conversation channel; said baseband signals from said variable frequency generator containing at least partially said personal identification number.

15. In a wireless communication system requiring a unique valid identity for each valid mobile unit operating in said wireless communication system, a mobile unit identity security system comprised of:

a jamming transmitter for making a plurality of jamming transmissions on the same frequency or frequencies on which said valid mobile units transmit; each of said jamming transmissions containing at least a controlled mobile unit identity specifically selected or created for allowing monitoring of unauthorized mobile units which utilize or attempt to utilize said controlled mobile unit identities, at least a portion of each of said jamming transmissions being concurrent with at least a portion of normal mobile transmissions made by said valid mobile units; transmitted signals of said jamming transmissions being substantially canceled out prior to the input of decoding circuits of system receivers of said wireless communication system, causing said decoding circuits of said system receivers of said wireless communication system to ignore said jamming transmissions, processing instead said normal mobile transmissions made by said valid mobile units; said substantial canceling of said transmitted signals comprising the introduction of an out of phase and level adjusted replica of said transmitted signals at a point prior to said input of said decoding circuits of said system receivers.

16. In a wireless communication system requiring a unique valid identity for each valid mobile unit operating in said wireless communication system, a method for protecting said unique valid identities, comprising the steps of:

a) creating or selecting a plurality of controlled mobile unit identities specifically for allowing monitoring of the activities of unauthorized mobile units which utilize or attempt to utilize said controlled mobile unit identity, b) making transmissions containing information representing said plurality of said controlled mobile unit identities.

17. The method for protecting unique valid identities as set forth in claim 16, wherein said controlled mobile unit identity is considered valid by said wireless communication system.

18. The method for protecting unique valid identities as set forth in claim 16, wherein said controlled mobile unit identity is considered invalid by said wireless communication system.

19. The method for protecting unique valid identities as set forth in claim 16, wherein said wireless communication system comprises at least one call setup channel and at least one conversation channel, said wireless communication system requiring said valid mobile units to send a valid personal identification number on said conversation channel; further comprising the steps of:

c) creating or selecting a specific personal identification number, d) making a conversation transmission on said conversation channel, said conversation transmission containing at least said specific personal identification number.

20. The method for protecting unique valid identities as set forth in claim 16, wherein at least some of said transmissions are prematurely terminated, preventing unauthorized listening devices from completely decoding said controlled mobile unit identity.

* * * * *